US012200572B2

(12) United States Patent
Russell et al.

(10) Patent No.: US 12,200,572 B2
(45) Date of Patent: Jan. 14, 2025

(54) ENVIRONMENT DEAD ZONE DETERMINATION BASED ON UWB RANGING

(71) Applicant: Motorola Mobility LLC, Chicago, IL (US)

(72) Inventors: Michael E. Russell, Lake Zurich, IL (US); Jarrett K. Simerson, Northbrook, IL (US); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 191 days.

(21) Appl. No.: 17/566,530

(22) Filed: Dec. 30, 2021

(65) Prior Publication Data

US 2023/0217215 A1    Jul. 6, 2023

(51) Int. Cl.
*H04W 4/024* (2018.01)
*G01S 5/02* (2010.01)
(Continued)

(52) U.S. Cl.
CPC ......... *H04W 4/029* (2018.02); *G01S 5/02526* (2020.05); *G01S 5/14* (2013.01);
(Continued)

(58) Field of Classification Search
CPC ..... H04W 4/029; H04W 4/023; H04W 4/026; H04W 48/16; G01S 5/02526; G01S 5/14;
(Continued)

(56) References Cited

U.S. PATENT DOCUMENTS 6,677,895 B1 * 1/2004 Holt ................ H04W 64/00
342/465
7,976,386 B2    7/2011 Tran
(Continued)

FOREIGN PATENT DOCUMENTS

CN    107907857 A    4/2018
CN    107991647 A    5/2018
(Continued)

OTHER PUBLICATIONS

U.S. Appl. No. 17/473,671, "Non-Final Office Action", U.S. Appl. No. 17/473,671, filed Jul. 14, 2023, 6 pages.
(Continued)

*Primary Examiner* — Dai Phuong
(74) *Attorney, Agent, or Firm* — FIG. 1 Patents

(57) ABSTRACT

In aspects of environment dead zone determination based on UWB ranging, a system includes ultra-wideband (UWB) radios associated with respective devices in an environment. An automation controller receives UWB ranging data from the UWB radios, and can monitor locations of the respective devices in the environment. The automation controller can detect a loss of coverage by a device connected in the environment, and determine a coverage dead zone within the environment at the location of the loss of coverage by the device based on the UWB ranging data. A computing device can implement the automation controller that receives the UWB ranging data from the UWB radios, and monitors the locations of the respective devices in the environment. The automation controller can detect the loss of coverage by the device, and determine the coverage dead zone within the environment at the location of the loss of coverage by the device.

20 Claims, 9 Drawing Sheets

(51) Int. Cl.
  G01S 5/14       (2006.01)
  G01S 13/02      (2006.01)
  G01S 13/46      (2006.01)
  H04W 4/02       (2018.01)
  H04W 4/029      (2018.01)
  H04W 48/16      (2009.01)

(52) U.S. Cl.
  CPC .......... *G01S 13/0209* (2013.01); *G01S 13/46* (2013.01); *H04W 4/023* (2013.01); *H04W 4/026* (2013.01); *H04W 48/16* (2013.01); *G01S 2013/468* (2013.01)

(58) Field of Classification Search
  CPC . G01S 13/0209; G01S 13/46; G01S 2013/468
  See application file for complete search history.

(56) References Cited

U.S. PATENT DOCUMENTS

| | | |
|---|---|---|
| 8,483,853 B1 | 7/2013 | Lambourne |
| 9,244,525 B2 | 1/2016 | Crawford et al. |
| 10,158,536 B2 | 12/2018 | Kim et al. |
| 10,277,981 B1 | 4/2019 | Frank |
| 10,484,832 B1 | 11/2019 | Tyagi et al. |
| 10,499,194 B1 | 12/2019 | Tyagi et al. |
| 10,554,439 B1 | 2/2020 | Plummer et al. |
| 10,869,166 B2 | 12/2020 | Tyagi et al. |
| 11,051,260 B2 | 6/2021 | Gorsica et al. |
| 11,543,530 B1 | 1/2023 | Liu et al. |
| 11,828,832 B2 | 11/2023 | Henry et al. |
| 11,832,208 B2 | 11/2023 | Henry et al. |
| 11,863,340 B2 | 1/2024 | Jun et al. |
| 11,864,056 B2 | 1/2024 | Faustino |
| 11,990,012 B2 | 5/2024 | Russell et al. |
| 11,991,586 B2 | 5/2024 | Brumley et al. |
| 12,004,046 B2 | 6/2024 | Russell et al. |
| 12,063,059 B2 | 8/2024 | Russell et al. |
| 12,069,120 B2 | 8/2024 | Russell et al. |
| 12,101,680 B2 | 9/2024 | Culiac et al. |
| 12,112,224 B2 | 10/2024 | Hollar et al. |
| 12,152,902 B2 | 11/2024 | Russell et al. |
| 2007/0254626 A1 | 11/2007 | Ahlgren |
| 2012/0027194 A1* | 2/2012 | Deshpande ........... H04M 3/493 379/265.01 |
| 2013/0310055 A1* | 11/2013 | Dewing .............. H04M 7/0057 455/450 |
| 2014/0057675 A1 | 2/2014 | Meyers et al. |
| 2014/0073252 A1 | 3/2014 | Lee et al. |
| 2015/0193036 A1 | 7/2015 | Yoo et al. |
| 2016/0212579 A1 | 7/2016 | Duan et al. |
| 2017/0013406 A1* | 1/2017 | Oliver .................. H04L 65/612 |
| 2017/0039783 A1* | 2/2017 | Hobel .................... H04L 67/01 |
| 2017/0245116 A1* | 8/2017 | Chu ..................... H04B 17/318 |
| 2017/0289951 A1 | 10/2017 | Dey et al. |
| 2018/0045807 A1* | 2/2018 | Senna .................. G01S 5/0081 |
| 2018/0107446 A1 | 4/2018 | Wilberding et al. |
| 2018/0302869 A1 | 10/2018 | Hollar |
| 2019/0041869 A1* | 2/2019 | Shao .................... G05D 1/0278 |
| 2019/0132839 A1* | 5/2019 | Li .......................... H04W 74/04 |
| 2019/0182734 A1* | 6/2019 | Laliberte .............. H04W 24/08 |
| 2019/0208270 A1 | 7/2019 | Bates et al. |
| 2019/0340396 A1 | 11/2019 | Mills et al. |
| 2020/0037112 A1 | 1/2020 | Tyagi et al. |
| 2020/0228943 A1 | 7/2020 | Martin et al. |
| 2020/0401365 A1 | 12/2020 | Wilberding et al. |
| 2021/0063556 A1* | 3/2021 | Usaj ..................... G01S 11/06 |
| 2021/0064043 A1 | 3/2021 | Kulkarni et al. |
| 2021/0088456 A1 | 3/2021 | Asayama et al. |
| 2021/0092563 A1 | 3/2021 | Hollar et al. |
| 2021/0190940 A1 | 6/2021 | Troutman |
| 2021/0224492 A1 | 7/2021 | Eisendle et al. |
| 2021/0241551 A1 | 8/2021 | Loeshelle |
| 2021/0304577 A1 | 9/2021 | Hollar et al. |
| 2021/0320681 A1 | 10/2021 | Baek et al. |
| 2021/0383624 A1 | 12/2021 | Hoyer et al. |
| 2022/0095120 A1* | 3/2022 | Panje .................... H04B 17/318 |
| 2022/0201427 A1 | 6/2022 | Rechenberger |
| 2022/0244367 A1 | 8/2022 | Shin et al. |
| 2022/0283321 A1 | 9/2022 | Ng et al. |
| 2022/0394347 A1 | 12/2022 | Cheong et al. |
| 2022/0394660 A1 | 12/2022 | Werner et al. |
| 2023/0075389 A1 | 3/2023 | Wu et al. |
| 2023/0078485 A1 | 3/2023 | Russell et al. |
| 2023/0079580 A1 | 3/2023 | Russell et al. |
| 2023/0168343 A1 | 6/2023 | Russell et al. |
| 2023/0169839 A1 | 6/2023 | Russell et al. |
| 2023/0171298 A1 | 6/2023 | Russell et al. |
| 2023/0184561 A1* | 6/2023 | Salter .................... B60R 25/245 701/428 |
| 2023/0195411 A1 | 6/2023 | Lewis et al. |
| 2023/0217210 A1 | 7/2023 | Russell et al. |
| 2023/0231591 A1 | 7/2023 | Russell et al. |
| 2024/0031932 A1 | 1/2024 | Zhang |

FOREIGN PATENT DOCUMENTS

| | | |
|---|---|---|
| CN | 108650623 A | 10/2018 |
| CN | 109725338 A | 5/2019 |
| CN | 109754553 A | 5/2019 |
| CN | 111103611 A | 5/2020 |
| CN | 112911505 A | 6/2021 |
| CN | 113115208 A | 7/2021 |
| CN | 113453147 A | 9/2021 |
| CN | 217643343 U | 10/2022 |
| EP | 3680687 A1 | 7/2020 |
| KR | 102104088 B1 | 4/2020 |
| KR | 102328673 B1 | 11/2021 |
| WO | 2019221800 A1 | 11/2019 |

OTHER PUBLICATIONS

U.S. Appl. No. 17/579,933, "Final Office Action", U.S. Appl. No. 17/579,933, filed Jun. 12, 2023, 10 pages.
GB2216213.5 , "Combined Search and Examination Report", GB Application No. GB2216213.5, Apr. 28, 2023, 10 pages.
U.S. Appl. No. 17/536,535, "Non-Final Office Action", U.S. Appl. No. 17/536,535, filed Apr. 18, 2023, 20 pages.
U.S. Appl. No. 17/536,636, "Non-Final Office Action", U.S. Appl. No. 17/536,636, filed Mar. 3, 2023, 12 pages.
U.S. Appl. No. 17/579,933, "Non-Final Office Action", U.S. Appl. No. 17/579,933, filed Mar. 16, 2023, 8 pages.
Cheong, Minho , et al., "US Provisional Application as Filed", U.S. Appl. No. 63/197,867, filed Jun. 7, 2021, 68 pages.
GB2213053.8 , "Combined Search and Examination Report", GB Application No. GB2213053.8, Feb. 23, 2023, 10 pages.
GB2213121.3 , "Search Report", GB Application No. GB2213121.3, Mar. 9, 2023, 5 pages.
U.S. Appl. No. 17/473,477, "Non-Final Office Action", U.S. Appl. No. 17/473,477, filed Sep. 14, 2023, 12 pages.
U.S. Appl. No. 17/536,535, "Final Office Action", U.S. Appl. No. 17/536,535, filed Aug. 11, 2023, 25 pages.
U.S. Appl. No. 17/536,636, "Non-Final Office Action", U.S. Appl. No. 17/536,636, filed Jul. 13, 2023, 14 pages.
U.S. Appl. No. 63/261,929, "Provisional Application", U.S. Appl. No. 63/261,929, filed Sep. 30, 2021, 62 pages.
"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy- smarttag-plus/>., May 11, 2021, 8 Pages.
"Car Connectivity Consortium", Car Connectivity Consortium [retrieved Jun. 28, 2021]. Retrieved from the Internet <https://carconnectivity.org/>., Feb. 22, 2018, 6 Pages.
"FiRa Consortium, Inc.", FiRa Consortium, Inc. [retrieved Jun. 28, 2021]. Retrieved from the Internet <https://www.firaconsortium.org/>., Aug. 1, 2019, 3 Pages.
"Tile Bluetooth Tracking Device", Tile Inc. [retrieved Jun. 28, 2021]. Retrieved from the Internet <https://www.thetileapp.com/en-us/how-it-works>., 2012, 18 Pages.

(56) References Cited

OTHER PUBLICATIONS

Haselton, Todd, "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.
Pirch, Hans-Juergen, et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.
U.S. Appl. No. 17/473,477, "Advisory Action", U.S. Appl. No. 17/473,477, filed Feb. 12, 2024, 3 pages.
U.S. Appl. No. 17/473,477, "Final Office Action", U.S. Appl. No. 17/473,477, filed Dec. 29, 2023, 5 pages.
U.S. Appl. No. 17/473,671, "Notice of Allowance", U.S. Appl. No. 17/473,671, filed Jan. 24, 2024, 7 pages.
U.S. Appl. No. 17/536,535, "Non-Final Office Action", U.S. Appl. No. 17/536,535, filed Dec. 29, 2023, 26 pages.
U.S. Appl. No. 17/536,636, "Corrected Notice of Allowability", U.S. Appl. No. 17/536,636, filed Jan. 19, 2024, 3 pages.
U.S. Appl. No. 17/536,636, "Corrected Notice of Allowability", U.S. Appl. No. 17/536,636, filed Feb. 5, 2024, 3 pages.
U.S. Appl. No. 17/536,636, "Notice of Allowance", U.S. Appl. No. 17/536,636, filed Jan. 10, 2024, 9 pages.
U.S. Appl. No. 17/579,933, "Non-Final Office Action", U.S. Appl. No. 17/579,933, filed Dec. 19, 2023, 11 pages.
U.S. Appl. No. 17/473,477, "Non-Final Office Action", U.S. Appl. No. 17/473,477, filed Apr. 8, 2024, 6 pages.
U.S. Appl. No. 17/473,671, "Corrected Notice of Allowability", U.S. Appl. No. 17/473,671, filed Mar. 27, 2024, 2 pages.
U.S. Appl. No. 17/473,671, "Corrected Notice of Allowability", U.S. Appl. No. 17/473,671, filed May 6, 2024, 2 pages.
U.S. Appl. No. 17/536,499, "Non-Final Office Action", U.S. Appl. No. 17/536,499, filed Mar. 22, 2024, 13 pages.
U.S. Appl. No. 17/536,535, "Corrected Notice of Allowability", U.S. Appl. No. 17/536,535, filed Apr. 24, 2024, 2 pages.
U.S. Appl. No. 17/536,535, "Corrected Notice of Allowability", U.S. Appl. No. 17/536,535, filed May 3, 2024, 2 pages.
U.S. Appl. No. 17/536,535, "Notice of Allowance", U.S. Appl. No. 17/536,535, filed Apr. 10, 2024, 7 pages.
U.S. Appl. No. 17/536,636, "Corrected Notice of Allowability", U.S. Appl. No. 17/536,636, filed Apr. 17, 2024, 3 pages.
U.S. Appl. No. 17/579,933, "Corrected Notice of Allowability", U.S. Appl. No. 17/579,933, filed Apr. 10, 2024, 3 pages.
U.S. Appl. No. 17/579,933, "Corrected Notice of Allowability", U.S. Appl. No. 17/579,933, filed Apr. 23, 2024, 3 pages.
U.S. Appl. No. 17/579,933, "Notice of Allowance", U.S. Appl. No. 17/579,933, filed Mar. 29, 2024, 6 pages.
U.S. Appl. No. 17/473,477, filed Jul. 17, 2024, "Notice of Allowance", U.S. Appl. No. 17/473,477, filed Jul. 17, 2024, 8 pages.
U.S. Appl. No. 17/536,499, filed Aug. 1, 2024, "Final Office Action", U.S. Appl. No. 17/536,499, filed Aug. 1, 2024, 16 pages.
U.S. Appl. No. 17/536,535, filed Jun. 20, 2024, "Corrected Notice of Allowability", U.S. Appl. No. 17/536,535, filed Jun. 20, 2024, 2 pages.
U.S. Appl. No. 17/536,535, filed Jul. 17, 2024, "Supplemental Notice of Allowability", U.S. Appl. No. 17/536,535, filed Jul. 17, 2024, 2 pages.
U.S. Appl. No. 17/579,933, filed Jul. 9, 2024, "Corrected Notice of Allowability", U.S. Appl. No. 17/579,933, filed Jul. 9, 2024, 3 pages.
U.S. Appl. No. 17/473,477, filed Oct. 11, 2024, "Corrected Notice of Allowability", U.S. Appl. No. 17/473,477, filed Oct. 11, 2024, 2 pages.
U.S. Appl. No. 17/473,477, filed Oct. 24, 2024, "Corrected Notice of Allowability", U.S. Appl. No. 17/473,477, filed Oct. 24, 2024, 2 pages.
KM, Vishwanath, et al., "Pursuant to MPEP § 2001.06(b) the applicant brings the following co-pending application to the Examiner's attention:", U.S. Appl. No. 18/780,990, filed Jul. 23, 2024, 43 pages.
U.S. Appl. No. 17/566,522, filed Nov. 7, 2024, "Non-Final Office Action", U.S. Appl. No. 17/566,522, filed Nov. 7, 2024, 10 pages.

* cited by examiner

ENVIRONMENT DEAD ZONE DETERMINATION BASED ON UWB RANGING

BACKGROUND

Ultra-wideband (UWB) is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

BRIEF DESCRIPTION OF THE DRAWINGS

Implementations of the techniques for a UWB automation experiences controller and environment dead zone determinations are described with reference to the following Figures. The same numbers may be used throughout to reference like features and components shown in the Figures.

DETAILED DESCRIPTION

Figure 1:
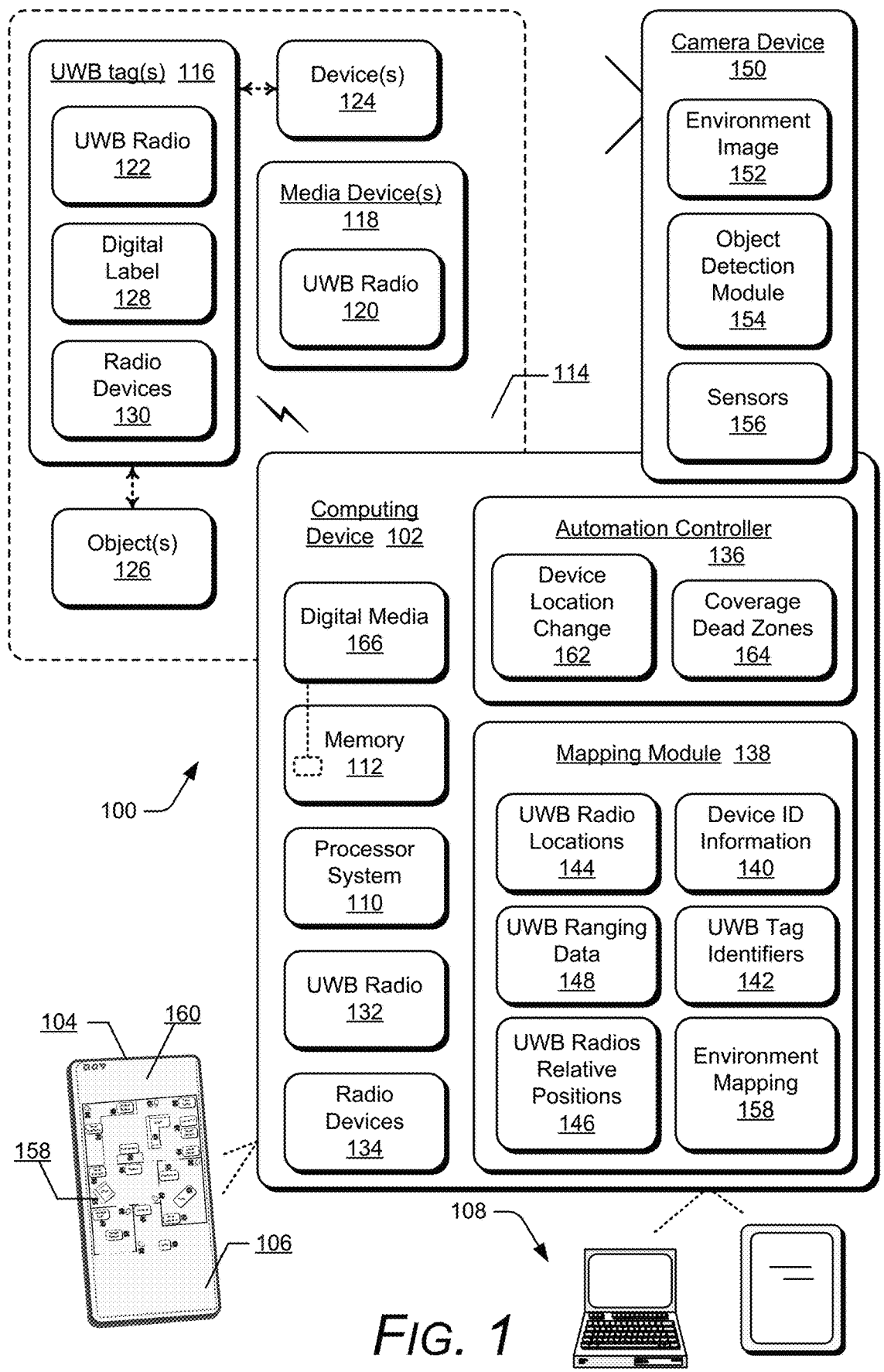
FIG. 1 illustrates example devices and features for environment dead zone determinations based on UWB ranging in accordance with one or more implementations as described herein.

Implementations of techniques for environment dead zone determinations based on UWB ranging are implemented utilizing ultra-wideband (UWB) radios as described, and provide techniques that can be implemented by any type of computing devices, such as smart devices, mobile devices (e.g., cellular phones, tablet devices, smartphones, wireless devices), consumer electronics, media devices, smart home automation devices, and the like. Generally, UWB-enabled smart devices, such as smartphones and home automation devices, can be used to determine spatial awareness that provides features implemented in smart homes and buildings with access control, security, location-based services, and peer-to-peer applications.

In aspects of the described techniques, a system includes UWB radios associated with respective devices in an environment. Generally, media devices and/or other devices can be objects in an environment that may be implemented with a UWB radio for UWB communications. In other implementations, UWB tags include a UWB radio and can be located for association with respective objects in an environment, to include non-UWB-enabled devices, and each UWB tag can be identified with a digital label indicative of the association with one or more tagged objects. As described herein, an object in the environment can include tagged objects, as well as non-tagged objects, and may be any type of a smart device, mobile device, wireless device, electronic device, media device, or a non-communication-enabled, static object or device.

In implementations, one or more of the UWB radios may be UWB tags located for association with a respective object, general device, smart device, mobile device, wireless device, electronic device, and/or media device. A UWB tag may be located for association with any type of device or other object in the environment, and the UWB tag can determine an identity of the associated device based on a Bluetooth MAC ADDR and/or other device identifying information communicated from a smart device, media device, or other object. Generally, the tagging of a respective object (to include any type of device) in the environment is a function of identifying a position or location of the object in the environment, and attaching a semantic label to the UWB radio of a UWB tag that is located and associated with the respective object.

The described techniques can utilize UWB ranging data, such as time-of-flight (ToF), angle-of-arrival (AoA), and/or time-difference-of-arrival (TDoA), as well as Wi-Fi and/or Bluetooth RSSI measurements, and optionally camera imaging, to determine UWB radio and UWB tag locations in the environment. The UWB precise location positioning capabilities is utilized to enable location detection of the UWB radios and UWB tags at particular locations in the environment, which can then be used to enhance the wireless and digital experience in a smart home environment by utilizing the precise and secure location positioning features.

The system can also include a mapping module, such as implemented by a computing device in the environment, and the mapping module determines the location of each of the UWB radios implemented in UWB-enabled devices, and the location of each tagged object in the environment based on a position of a UWB tag associated with the tagged object. The mapping module is also implemented to determine a location of each of the non-tagged objects in the environment, such as based on the positions of the UWB tags in the environment. The mapping module can determine the location of each of the UWB radios and/or UWB tags in the environment, and determine relative positions of each of the UWB radios and UWB tags with respect to each other. The mapping module obtains UWB ranging data received from the UWB radios and/or the UWB tags via in-band session exchanges with a UWB radio, and determines the location and the relative position of each of the UWB radios and UWB tags in the environment based on the UWB ranging data.

In implementations, a camera device in the environment can be used to capture an image of the environment, or a region of the environment. An object detection module can then be utilized to identify the objects in the environment from the captured image, and the mapping module can determine the location and the relative position of each of the tagged objects and the non-tagged objects in the environment based on the UWB radios, the UWB tags, and the identified objects in the environment. In implementations, the mapping module can generate an environment mapping, such as a location association map that is generally a floor plan of a building, such as in a smart home that includes the locations of the objects, general devices, media devices, and/or smart devices, with the floor plan including positions of the walls of the building as determined from the captured image. In implementations, the mapping module generates the environment mapping to show the relative location of the objects in the environment. The environment mapping can be generated by comparing spatial distances between the identified objects appearing in the captured environment image and UWB ranging data received from one or more of the UWB radios and/or UWB tags in the environment.

A computing device in the environment can include stored digital media that is accessible for playback on one or more of the media devices in the environment. Alternatively or in addition, the digital media is accessible from a network server device for playback on a media device in the environment, and the digital media is communicated from the network server device to the media device for playback of the digital media. For example, the digital media that is accessible for playback from the computing device or from a network server device may be audio digital media, and the automation controller can initiate to communicate the audio digital media to an audio playback media device in the environment. Similarly, the digital media that is accessible for playback from the computing device or from a network server device may be video digital media, and the automation controller can initiate to communicate the video digital media to a video playback media device in the environment. In other media playback implementations, a discover and launch (DIAL) type protocol can be implemented for casting, where a user of a computing device (e.g., a mobile wireless device) selects media content for playback on a media device in the environment, and the media content is then cast from the wireless device or from a network server device to the media device for the digital media playback in the environment.

The system also includes an automation controller, such as implemented by a computing device in the environment, and the automation controller can receive location information for each of the devices in the environment based on a position of the UWB radio associated with a respective device. The automation controller and/or the mapping module can determine a location of each of the media devices and other devices relative to the position of a person in the environment, such as the position of the person as closest to the location of a media device in the environment for digital media playback of digital media. For example, the position of a person and/or the location of a media device in the environment can be determined utilizing the UWB ranging data, given that UWB time-of-flight (ToF), angle-of-arrival (AoA), and/or time-difference-of-arrival (TDoA) provides a vector of both range and direction.

Additionally, video digital media can be cast or communicated to a media device for video media playback based on which way a smart display or other television device is facing, taking into consideration the orientation of the person and/or mobile device in the environment. Utilizing the UWB ranging data and AoA techniques, as well as sensors on a wireless device and/or a captured image of the environment, the automation controller can determine the direction that a user's phone is facing, and the most likely media device to cast or communicate the digital media for media playback. The automation controller can receive orientation information that indicates an orientation of the person and/or mobile device in the environment, and initiate the communication of the digital media to the media device that corresponds to the orientation of the person and/or mobile device for viewing the digital media.

In implementations, the UWB radios in the environment and the UWB ranging data can provide the relative orientation between the UWB radios, as well as with additional sensors that indicate an orientation of the user who carries a wireless device in the environment. For example, the UWB antenna array in a wireless device, which is carried by a user in the environment, can be used as an indication of the orientation of the person in the environment, such as based on whether the user is facing normal to the device (0 degree angle), sideways to the device (90 degree angle), or facing away from the device (180 degree angle).

Other sensors of a mobile wireless device can also indicate a particular orientation of the device to the user, such as in a pocket and the device display is facing the body of the user, which would indicate that the UWB antenna array is pointed in the direction the user is moving. Alternatively, the device display may be facing outwards away from the body of the user, which would indicate that the UWB antenna array is pointed in an opposite direction to the vector of travel of the user. In other implementations utilizing sensors of the wireless device, the orientation of the user in the environment may be determinable by the automation controller based on user face detection, eye gaze detection with a camera of the device, and/or with other types of sensors that sense proximity of the user. The automation controller can then initiate to cast or communicate the video digital media to a media device for video media playback based on the user orientation and/or where the user is looking.

Alternatively or in addition, a camera device can be used to capture an image of the environment, and the object detection module is utilized to determine the orientation of the user in the environment from the captured image. The automation controller can then receive the orientation information from the camera device and/or from the object detection module. In implementations, the automation controller can also determine the position of a person within a room of a building (e.g., the environment) that includes the location of a media device for digital media playback of the digital media. Additionally, as the person moves a mobile wireless device (e.g., computing device) within the building environment, such as from room to room, the automation controller can determine a subsequent position of the wireless device within a different room of the building, and transfer the casting or communication of the digital media to a different media device in the different room for the digital media playback of the digital media, based on the determined subsequent position of the person in the environment relative to the location of the different media device.

Additionally, the camera devices in the environment, such as a security camera, indoor environment camera, a doorbell camera, a mobile device camera, a camera integrated with a computing device or a media device, and the like, can capture motions in the environment. Alternatively or in addition, a mobile wireless device may be moved by a user in the environment, like a wand device, to generate motions detected by sensors of the mobile wireless device. The motions of the mobile wireless device may also be captured by the camera devices in the environment. The automation controller can then determine, from a captured motion and/or from a motion detected by device sensors, a motion indication to interact with a device in the environment. The interaction with a device can be based on a location of the device as determined by a position of the UWB radio associated with the device. The automation controller can initiate a control communication to the device to control the device based on the motion indication to interact with the device.

In aspects of a UWB automation experiences controller, as described herein, the automation controller can be implemented by a computing device or mobile device, and the automation controller can coordinate experiences in the environment that has multiple UWB radios and/or UWB-enabled devices. The automation controller can coordinate the networked and/or UWB-enabled devices for automation experiences in the environment, where the devices may include media devices, smart devices, UWB-enabled devices, UWB tags, sensors, camera devices, as well as any other type of computing, electronic, and/or mobile devices. The automation controller can aggregate sensor data, device data, and UWB ranging data (e.g., ToF and AoA data), which can then be used to determine an environment experience. Generally, the automation controller is a logical controller, which can be implemented by a device in the environment, as a smart home hub, or as a cloud-based controller for data aggregation and processing. For example, the automation controller can monitor streaming media, screen sharing, and devices entering or exiting the environment, as well as any other type of device interactions and movement in the environment.

In aspects of the described techniques, the automation controller can receive UWB ranging data from the UWB radios in the environment, and monitor locations of the respective devices in the environment based on the UWB ranging data received from the UWB radios. The automation controller can also monitor the various interactions with the respective devices in the environment, such as wireless communications on a mobile wireless device, and streaming digital media to a media device in the environment. Other interactions with devices can include automation experiences with Internet-of-things (IoT) devices, home automation devices, and/or home automation systems in the environment. The automation controller may also receive sensor data from one or more of the devices in the environment, and correlate the sensor data with the UWB ranging data to monitor the locations of the respective devices in the environment. In implementations, the sensor data can include an image of the environment captured with a camera device in the environment, orientation data that indicates an orientation of a mobile device in the environment, and/or motion data. Similarly, the automation controller may also receive global positioning system (GPS) data from one or more of the devices in the environment, and correlate the GPS data with the UWB ranging data to monitor the locations of the respective devices in the environment.

The automation controller can determine a location change of a device in the environment, such as based on the UWB ranging data and/or other sensor data, and then update an automation experience in the environment based on a monitored interaction and/or the location change of the device in the environment. For example, a user may carry a mobile wireless device in the environment, and the device implements the automation controller, which can determine when the mobile wireless device enters or exits the environment. In implementations, the automation controller can update the automation experience in the environment based on the sensor data, such as based on the image of the environment, based on the orientation of a mobile device in the environment, and/or based on the motion data corresponding to detected motions in the environment.

In implementations, the automation controller can update an automation experience in the environment by initiating (e.g., interacting, turning-on, turning-off, etc.) an IoT device, a home automation device, and/or any type of home automated system. The automation controller may also queue digital media for playback at selected media devices in the environment, and update the automation experience by initiating digital media playback at a selected media device, such as based on the location and/or orientation of a user and device in the environment. For example, an automation experience may include streaming digital media to a media device in the environment, and the automation controller can update the automation experience by initiating a transfer of the streaming digital media to an alternate media device in the environment.

In aspects of environment dead zone determination based on UWB ranging, as described herein, the automation controller implemented by a computing device or mobile device can be used to determine coverage dead zones in an environment, such as to determine where voice-over-IP (VOIP) or cellular calls are dropped. The automation controller can also determine coverage dead zones where digital media, such as audio and/or video streaming media, does not playback on a device in the environment. The automation controller can also determine locations in the environment where motions (e.g., gestures) are not detectable in the environment due to lack of camera device coverage. In implementations, the automation controller can determine or assess coverage dead zones in the environment based on limited or no signal strength (e.g., received signal strength indicator (RSSI) measurements) and/or based on quality of service (QOS) metrics.

In aspects of the described techniques, the automation controller can receive UWB ranging data from the UWB radios in the environment, and monitor locations of the respective devices in the environment. The automation controller can also detect a loss of coverage by a device connected in the environment, and determine a coverage dead zone within the environment at the location of the loss of coverage by the device based on the UWB ranging data. The loss of coverage by the device in the environment may be a voice-over-IP (VOIP) or cellular call dropped by the device. Alternatively, the loss of coverage may be detected by the automation controller as an interruption of streaming digital media to a media device. Further, the loss of coverage may include non-detectable motions in the environment due to a lack of camera coverage.

In implementations, the automation controller can determine the coverage dead zone based on a time-difference-of-arrival (TDoA) between the device and an access point, and the angle-of-arrival (AoA) to the access point. The automation controller can also map the coverage dead zone based on received signal strength indicator (RSSI) measurements and quality of service (QOS) metrics from the location of the loss of coverage by the device.

In aspects of the described techniques, the device that loses coverage may be a mobile wireless device, such as carried in the environment by a user of the device, and the automation controller can determine the coverage dead zone based on an orientation of the mobile wireless device at the location of the loss of coverage. Further, the automation controller can detect that the mobile wireless device is wirelessly connected for communication in the environment and moving in a direction toward a coverage dead zone, and initiate the mobile wireless device switching from VoIP to cellular to maintain the communication in the coverage dead zone.

While features and concepts of the described techniques for a UWB automation experiences controller and environment dead zone determinations can be implemented in any number of different devices, systems, environments, and/or configurations, implementations of the techniques for a UWB automation experiences controller and environment dead zone determinations are described in the context of the following example devices, systems, and methods.

FIG. 1 illustrates an example system 100 for environment dead zone determinations based on UWB ranging, as described herein. Generally, the system 100 includes a computing device 102, which can be utilized to implement features and techniques of object control based on motions determined as motion indications to control a device in an environment. In this example system 100, the computing device 102 may be a wireless device 104 with a display screen 106, such as a smartphone, mobile phone, or other type of mobile wireless device. Alternatively or in addition, the system 100 can include the computing device 102 as any type of an electronic, computing, and/or communication device 108, such as a computer, a laptop device, a desktop computer, a tablet, a wireless device, a camera device, a smart device, a media device, a smart display, a smart TV, a smart appliance, a home automation device, and so forth. The computing device 102 can be implemented with various components, such as a processor system 110 and memory 112, as well as any number and combination of different components as further described with reference to the example device shown in FIG. 9. For example, the wireless device 104 can include a power source to power the device, such as a rechargeable battery and/or any other type of active or passive power source that may be implemented in an electronic, computing, and/or communication device.

In implementations, the wireless device 104 may be communicatively linked, generally by wireless connection, to UWB radios of UWB tags and/or to other UWB-enabled devices for UWB communication in an environment 114. Generally, the environment 114 can include the computing device 102, the wireless device 104, media devices, objects, the UWB tags 116, and other UWB-enabled devices implemented with a UWB radio for communication utilizing UWB, as well as any number of the other types of electronic, computing, and/or communication devices 108 described herein. The wireless UWB communications in the environment 114 are similar between the UWB tags 116 and/or other UWB-enabled devices, such as the media devices 118, in the environment. The UWB tags 116 can be placed in the environment proximate each of the objects and other devices, and then labeled with a functional name to indicate a UWB tag association with a particular object and/or device. Given the angular precision and centimeter accurate ranging that UWB provides, location detection of UWB radios and UWB tags 116 at particular locations in the environment 114 can be used to enhance the wireless and digital experience in a smart home environment.

In this example system 100, media devices 118 may be enabled for UWB communications with an embedded UWB radio 120. Alternatively, a UWB tag 116 having a UWB radio 122 may be associated with any other types of devices 124 that are not UWB-enabled in the environment 114. Similarly, a UWB tag 116 may be associated with any type of object 126 in the environment, to include any type of a smart device, media device, mobile device, wireless device, and/or electronic device, as well as associated with a static object or device that is not enabled for wireless communications. For example, the UWB tags 116 can be positioned and located in the environment 114 for association with respective devices and/or objects, and each UWB tag 116 can be identified with a digital label 128 indicative of the association with one or more of the objects 126 and/or devices 124 in the environment. For example, an object 126 may be a smart TV in a home environment, and the digital label 128 of the UWB tag 116 indicates "smart TV" as the identifier of the UWB tag association. Similarly, an object 126 may be a floor lamp in the home environment, and the digital label 128 of the UWB tag 116 indicates "floor lamp" as the identifier of the UWB tag association. Notably, the tagging is a function of identifying a position of an object 126 or a device 124, and attaching a semantic label (e.g., "TV", "lamp", "chair", etc.) to the UWB radio 122 of the UWB tag 116 that is located and associated with a respective object or device.

In some instances, one or more of the media devices 118, the other devices 124, and/or the objects 126 in the environment 114 may already be UWB-enabled with a UWB radio 120 for wireless communication with the other devices and with the UWB tags 116 in the environment. The wireless UWB communications for mapping objects 126 and/or devices 124 in the environment 114 are similar between the UWB tags 116 and/or the UWB-enabled media devices 118 in the environment. A network of the UWB tags 116 in the environment 114 can discover and communicate between themselves and/or with a control device or controller logic that manages the devices 124 and UWB tags in the environment. In implementations, a UWB tag 116 can be used at a fixed location to facilitate accurate location, mapping, and positioning of inanimate objects and/or areas in the environment 114.

The UWB protocol is designed to utilize out-of-band communications that use low-power, wireless protocols for UWB device discovery and UWB session configuration, such as via Bluetooth or Bluetooth Low Energy (BLE), which uses less power than if a UWB radio was used alone. Additionally, using BLE for UWB out-of-band communications provides for a large network effect given the number of devices that are already BLE-enabled. Because BLE is able to receive and decode advertising packets, the UWB tags 116 placed in the environment 114 proximate a device, for example, can determine the nearest Bluetooth MAC ADDR and likely an indication of the device name of the nearby device. When the nearest device name is not advertised, the UWB tag can check against the BD ADDR that is already known on the computing device 102, which is also particularly useful if privacy settings are enabled and an identity resolving key is not available on the UWB Tag.

Alternatively or in addition to a UWB tag 116 receiving address and device identifying information from nearby devices (to include media devices), and then identifying the device 124, the computing device 102 can communicate with the UWB tags 116 and the UWB radios of other devices in the environment, and receive Bluetooth or BLE advertised communications from the UWB tags and UWB radios of the devices. The computing device 102 may be a centralized controller and/or a mobile device in the environment that correlates a UWB tag 116 with a nearby device 124 based on RSSI measurements of the Bluetooth or BLE advertised communications from the UWB tags and devices.

For example, the computing device 102 can receive advertised signals from a UWB tag 116 or other UWB-enabled device, and compare the signal path loss from the received signals to determine that the UWB tag and device are proximate each other in the environment 114 based on similar signal path loss.

In aspects of the described features, user interaction can be minimized or eliminated as the UWB tags 116 are implemented to automate identification and labeling, such as by using Bluetooth or BLE communications and/or captured images. For example, when the UWB tag 116 is located for association with a device 124 in the environment 114, the UWB tag can determine an identity of the device based on a Bluetooth MAC ADDR and/or other device identifying information communicated from the device. Additionally, the UWB tag 116 can utilize received Wi-Fi or Bluetooth RSSI measurements in conjunction with the UWB positioning information to generate and sort a list of nearby devices, and select the MAC ADDR of the device closest to the UWB tag. Further, in an environment that includes the computing device 102, such as a mobile phone, smartphone, or other wireless device that has a network association with the device 124 or media device 118, the UWB tag 116 that is located for association with the device 124 in the environment can receive an identity of the device from the computing device.

In this example system 100, a UWB tag 116 is generally representative of any UWB tag or device with embedded UWB in the environment 114, and can include various radios for wireless communications with other devices and/or with the other UWB tags in the environment. For example, the UWB tag 116 can include a UWB radio 122 and other radio devices 130, such as a Bluetooth radio, a Wi-Fi radio, and/or a global positioning system (GPS) radio implemented for wireless communications with the other devices and UWB tags in the environment 114. The computing device 102 also includes various radios for wireless communication with the media devices 118, other devices 124, and/or with the UWB tags 116 in the environment. For example, the computing device 102 includes a UWB radio 132 and other radio devices 134, such as a Bluetooth radio, a Wi-Fi radio, and a GPS radio implemented for wireless communications with the other devices and UWB tags 116 in the environment 114.

In implementations, the computing device 102, media devices 118, other devices 124, and/or the UWB tags 116 may include any type of positioning system, such as a GPS transceiver or other type of geo-location device, to determine the geographical location of a UWB tag, device, and/or the computing device. Notably, any of the devices described herein, to include components, modules, services, computing devices, camera devices, and/or the UWB tags, can share the GPS data between any of the devices, whether they are GPS-hardware enabled or not. Although the resolution of global positioning is not as precise as the local positioning provided by UWB, the GPS data that is received by the GPS-enabled devices can be used for confirmation that the devices are all generally located in the environment 114, which is confirmed by the devices that are also UWB-enabled and included in the environment mapping. Other objects and devices, such as a smart TV, smart home appliance, lighting fixture, or other static, non-communication-enabled objects, may not be GPS-hardware enabled, yet are included in the environment mapping based on the UWB tag and UWB radio associations with the respective objects and devices. The GPS location of these other objects and devices can be determined based on their relative position in the environment 114 and their proximity to the GPS-enabled devices. Accordingly, changes in location of both GPS-enabled devices and non-GPS devices and objects can be tracked based on global positioning and local positioning in the environment.

The computing device 102 can also implement any number of device applications and/or modules, such as any type of a messaging application, communication application, media application, and/or any other of the many possible types of device applications or application modules. In this example system 100, the computing device 102 implements an automation controller 136 and a mapping module 138, each of which may include independent processing, memory, and/or logic components functioning as a computing and/or electronic device integrated with the computing device 102. Alternatively or in addition, either of the automation controller 136 and the mapping module 138 can be implemented in software, in hardware, or as a combination of software and hardware components. In this example, each of the automation controller 136 and the mapping module 138 are implemented as a software application or module, such as executable software instructions (e.g., computer-executable instructions) that are executable with a processor (e.g., with the processor system 110) of the computing device 102 to implement the techniques and features described herein.

As a software application or module, the automation controller 136 and/or the mapping module 138 can be stored on computer-readable storage memory (e.g., the memory 112 of the device), or in any other suitable memory device or electronic data storage implemented with the module. Alternatively or in addition, either of the automation controller 136 or the mapping module 138 may be implemented in firmware and/or at least partially in computer hardware. For example, at least part of the modules may be executable by a computer processor, and/or at least part of the modules may be implemented in logic circuitry.

As described above, a UWB tag 116 that is located for association with a device 124 in the environment 114 can determine an identity of the device based on a Bluetooth MAC ADDR and/or other device identifying information communicated from the device. Generally, the UWB tags 116 can scan to receive device identifying information 140 communicated from nearby devices 124 in the environment. The device identifying information 140 can be communicated via Bluetooth or BLE from the devices as a device name, a Bluetooth MAC ADDR, and a received signal strength indication (RSSI). The UWB tag 116 can identify the device 124 that is located nearest to the UWB tag based on the device identifying information 140 received from the devices, and generate an ordered list of the devices based on the device identifying information to identify the device that is located nearest to the UWB tag. Additionally, the mapping module 138 implemented by the computing device 102 can receive the device identifying information 140 communicated from the devices 124 and media devices 118 in the environment, as well as the UWB tag identifiers 142 communicated from the UWB tags 116 in the environment.

In other implementations, and as described above, the computing device 102 can communicate with the UWB tags 116, UWB radios 120, 122, and with other the other devices 124 in the environment 114, receiving Bluetooth or BLE advertised communications from the UWB tags and devices. The computing device implements the mapping module 138, which can correlate a UWB tag 116 with a nearby device 124 based on RSSI measurements of the Bluetooth or BLE advertised communications from the UWB tags and devices.

For example, the computing device 102 can receive advertised signals from the UWB tags 116, UWB radios 120, 122, and/or the devices 124, and the mapping module 138 compares the signal path loss from the received signals to determine which of the UWB tags, UWB radios, and devices are proximate each other based on similar signal path loss. The mapping module 138 can also associate a UWB tag with a nearby device or media device, and communicate the association back to the UWB tag, such as via in-band UWB communications.

As noted above, the example system 100 includes the UWB tags 116 located for association with respective devices 124 and objects 126 in the environment 114, and the objects can include both tagged objects, as well as non-tagged objects. In aspects of the described techniques, the mapping module 138 implemented by the computing device 102 can determine the location of each of the tagged objects and devices in the environment 114 based on a position of a UWB tag 116 associated with a tagged object or device. The mapping module 138 can also determine a location of each of the objects, devices, and non-tagged objects based on the UWB radio locations 144 in the environment.

In implementations, the mapping module 138 can determine the UWB radio location 144 of each of the UWB tags 116 and UWB radios in the environment 114, and determines the relative positions 146 of each of the UWB radios with respect to each other. The mapping module 138 can obtain UWB ranging data 148, such as time-of-flight (ToF), angle-of-arrival (AoA), and/or time-difference-of-arrival (TDoA) data, as received from the UWB tags 116 and UWB radios via in-band session exchanges with the UWB radio 132 of the computing device 102. The time-of-flight (ToF) is a two-way communication between a UWB tag 116 and another device, while time-difference-of-arrival (TDoA) is one-way communication, where the UWB tag 116 communicates a signal but does not need to wait for a reply, such as from the computing device 102. The mapping module 138 may also receive and utilize other communication data that is shared over Bluetooth or BLE, such as relative position data shared between UWB devices. The mapping module 138 can then determine the location 144 and the relative position 146 of each of the UWB tags 116 and UWB radios in the environment 114 based on the UWB ranging data 148.

The mapping module 138 can also determine environment and object dimensions in the environment 114 based on the location and a relative position of each tagged object and non-tagged object in the environment. For example, the mapping module 138 can triangulate the wireless device 104 and two of the UWB tags 116 to determine a length and a width of the environment. The mapping module 138 can also determine an initial elevation of the wireless device 104 and a subsequent elevation of the wireless device in the environment 114, and then determine a volume of the environment based on the area of the environment and an elevation delta between the initial elevation and the subsequent elevation of the wireless device.

Although the mapping module 138 is shown and described as being implemented by the computing device 102 in the environment 114, any of the other computing devices in the environment may implement the mapping module 138 and/or an instantiation of the mapping module. For example, the system 100 includes a camera device 150, which may be an independent electronic, computing, and/or communication device in the environment 114, and the camera device 150 can implement the mapping module 138. Similarly, a control device or controller logic in the environment 114 can implement the mapping module, as well as a UWB tag 116 may implement the mapping module 138 in the environment.

In this example system 100, the camera device 150 may be implemented as a security camera, indoor environment camera, a doorbell camera, a mobile device camera, a camera integrated with a computing device or a media device, and the like. Generally, the camera device 150 may be implemented with any number and combination of the components described with reference to the computing device 102, where the camera device 150 can include an integrated UWB radio, as well as independent processing, memory, and/or logic components functioning as a computing and camera device. Alternatively, the camera device 150 may be implemented as a component of the computing device 102, such as in a mobile phone or other wireless device with one or more camera devices to facilitate image capture.

The camera device 150, such as any type of a security camera, indoor environment camera, a doorbell camera, a mobile device camera, a camera integrated with a computing device or a media device, or a camera device of the computing device 102, can be utilized to further implement the features and techniques described herein. The camera device 150 can be used to capture an image 152 of the environment 114 (or a region of the environment), and the camera device implements an object detection module 154 utilized to identify the media devices 118, other devices 124, and/or the objects 126 in the environment from the captured image. Similar to the mapping module 138, the object detection module 154 may include independent processing, memory, and/or logic components functioning as a computing and/or electronic device integrated with the camera device 150 and/or with the computing device 102. Alternatively or in addition, the object detection module 154 can be implemented in software, in hardware, or as a combination of software and hardware components. In this example, the object detection module 154 is implemented as a software application or module, such as executable software instructions (e.g., computer-executable instructions) that are executable with a device processor and stored on computer-readable storage memory (e.g., on memory of the device).

In implementations, the camera device 150 may also include various sensors 156, such as an infra-red (IR) time-of-flight (TOF) sensor that can be used in conjunction with the described techniques utilizing UWB. An advantage of utilizing UWB with the UWB tags 116 over conventional IR TOF is that UWB can still be used to perform ranging when occluded by objects, such as a wall or object in the environment 114 that blocks IR and for objects that may not be viewable in the captured environment images. However, IR TOF of the camera device 150 may still be utilized in conjunction with the techniques described herein for digital media playback based on the UWB tags.

In aspects of environment and object mapping, the object detection module 154 can be used to identify the objects 126 (e.g., to include the media devices 118 and other devices 124) in the environment 114 from the captured environment image 152. The mapping module 138 can then determine the location and the relative position of each of the tagged objects and the non-tagged objects in the environment based on the UWB tags 116 and the identified objects and devices in the environment. In implementations, the mapping module 138 can generate an environment mapping 158, such as a location association map, that is generally a floor plan of a building or smart-home environment, including the locations of the objects and devices in the building. The floor plan can be generated in a three-dimension coordinate system of the environment 114 including positions of the walls of the building as determined from the captured image. An example of a location association map showing the location of the devices and/or the objects in the environment 114 is further shown and described with reference to FIGS. 2 and 3.

In implementations, the mapping module 138 can also generate the environment mapping 158 as an environment depth map showing the relative location of the objects 126 and devices in the environment. As described herein, an object 126 in the environment may be any type of a smart device, general device, media device, mobile device, wireless, and/or electronic device, as well as a non-communication-enabled, static object or device. The environment depth map can be generated by comparing spatial distances between the objects identified by the object detection module 154 that appear in the captured environment image 152 and the UWB ranging data 148 received from one or more of the UWB tags 116 in the environment. As noted above, the UWB tags 116 can be used to perform ranging when occluded by objects, such as a wall or object in the environment 114 that blocks IR and for objects that may not be viewable in the captured environment images. However, IR TOF implemented as a sensor 156 of the camera device 150 may still be utilized in conjunction with the techniques described herein for digital media playback based on the UWB tags. An example of an environment depth map showing the location of the devices and/or the objects in the environment 114 is further shown and described with reference to FIG. 4.

As a device application implemented by the computing device 102, the mapping module 138 may have an associated application user interface 160 that is generated and displayed for user interaction and viewing, such as on the display screen 106 of the wireless device 104. Generally, an application user interface 160, or any other type of video, image, graphic, and the like is digital image content that is displayable on the display screen 106 of the wireless device 104. The mapping module 138 can generate and initiate to display the environment mapping 158 in the user interface 160 on the display screen 106 of the wireless device 104 for user viewing in the environment.

The example system 100 includes the computing device 102, which implements the automation controller 136 in aspects of a UWB automation experiences controller and for environment dead zone determinations. The automation controller 136 is implemented to coordinate experiences in the environment 114, which has the multiple UWB radios 120, 122 and/or UWB-enabled devices. The automation controller 136 can coordinate the networked and/or UWB-enabled devices for automation experiences in the environment, where the devices may include the media devices 118, smart devices, other UWB-enabled devices, the UWB tags 116, sensors (e.g., the camera device sensors 156, wireless device sensors), camera devices 150, and any other computing, electronic, and/or mobile devices 108. The automation controller 136 can aggregate sensor data, device data, and the UWB ranging data 148 (e.g., ToF and AoA data) to determine an environment experience. Generally, the automation controller is a logical controller, which can be implemented by a mobile device (e.g., the wireless device 104, a smartphone), by one of the other smart devices in the environment, a smart home hub, or as a cloud-based controller for data aggregation and processing.

In implementations, the automation controller 136 can monitor streaming media, screen sharing, and devices entering or exiting the environment 114, as well as any other type of device interactions and movement in the environment. In aspects of the described techniques, the automation controller 136 can receive the UWB ranging data 148 from the UWB radios 120, 122 in the environment, and monitor locations of the respective devices in the environment based on the UWB ranging data received from the UWB radios. The automation controller 136 can periodically monitor the UWB ranging data (e.g., ToF and AoA data) and determine whether a device and/or a user of the device is moving in the environment, and in which direction. Based on detected locations, motions, device interactions, and/or user and device orientations, the automation controller 136 can initiate, update, interact with, and/or control any type of home automation device, IoT device, and/or home automation system in the environment. For example, the automation controller 136 can monitor user and/or wireless device movements in the environment, and correspondingly, modify HVAC settings, turn-on and turn-off lights and devices, update a media experience, and/or any other type of environment automation experience.

The automation controller 136 can also monitor the various interactions with the respective devices in the environment, such as wireless communications on the wireless device 104, and streaming digital media to a media device 118 in the environment. For example, the automation controller 136 can detect or determine that a user is using the wireless device 104, such as for a VoIP call, and is moving within the environment 114. The automation controller 136 can then initiate devices in the environment to maintain the wireless connection to the wireless device as the user moves throughout the environment. Similarly, the automation controller 136 can manage digital media playback, such as music or streaming content, to follow a user throughout the environment, transferring from one device to another for content playback as the location, orientation, and/or direction of the user changes in the environment. In the event that a media playback device is not available at a particular location or region within the environment 114, or if the user takes the mobile device out of the environment, the automation controller 136 can initiate to pause the digital media playback.

The automation controller 136 may also receive sensor data from one or more of the devices in the environment, and correlate the sensor data with the UWB ranging data 148 to monitor the locations of the respective devices in the environment. In implementations, the sensor data can include a captured image 152 of the environment, as captured with a camera device 150, orientation data that indicates an orientation of a mobile device (e.g., the wireless device 104) in the environment, and/or motion data. Similarly, the automation controller may also receive global positioning system (GPS) data from one or more of the devices in the environment, and correlate the GPS data with the UWB ranging data 148 to monitor the locations of the respective devices in the environment.

In implementations, the automation controller 136 can receive location information from the mapping module 138 for each of the media devices 118, other devices 124, and objects 126 in the environment 114 based on a position of the UWB radio 120 associated with a respective media device, and for each of the other devices 124 and objects 126 based on a position of the UWB radio 122 of a UWB tag 116 that is associated with a respective device or object. The automation controller 136 can also determine a device location change 162 of a device in the environment 114, such as based on the UWB ranging data 148 and/or other sensor data, and then update an automation experience in the environment based on a monitored interaction and/or the location change 162 of the device in the environment. For example, a user may carry the wireless device 104 in the environment 114, and the wireless device implements the automation controller 136, which can determine when the wireless device enters or exits the environment, and where the device is as the user walks through a home environment, a business, a tradeshow, a retail store, or any other type of environment. The automation controller 136 can track the movements and/or orientation of a user (e.g., the wireless device 104), such as when the user walks through or around in the environment, such as from room to room in a building.

In implementations, the automation controller 136 can update an automation experience in the environment 114 based on any type of the sensor data that is received from the various devices, such as based on the captured image 152 of the environment, based on the orientation of the wireless device 104 in the environment, and/or based on motion data corresponding to detected motions in the environment. For example, the camera devices 150 in the environment 114, such as a security camera, indoor environment camera, a doorbell camera, a mobile device camera, a camera integrated with a computing device or a media device, and the like, can capture motions in the environment. Alternatively or in addition, a mobile wireless device 104 may be moved by a user in the environment, like a wand device, to generate motions detected by sensors of the mobile wireless device. The motions of the mobile wireless device 104 may also be captured by the camera devices 150 in the environment. In implementations, a wand device (e.g., the wireless device 104 motioned about by a user) may also be used for any type of multi-media control, and more broadly, can be used for any type of home automation device and/or system control. For example, waving the wand device toward a light or fixture in the environment may initiate the closest light (e.g., based on UWB measurements) to turn on or off, or waving the wand device toward one or more media devices can be used to initiate queuing up digital media for playback on the closest media device.

In implementations, the automation controller 136 can queue digital media 166 for playback at selected media devices 118 in the environment 114, and update the automation experience by initiating digital media playback at a selected media device, such as based on the location and/or orientation of a user and device in the environment. For example, an automation experience may include streaming digital media to a media device 118 in the environment, and the automation controller 136 can update the automation experience by initiating a transfer of the streaming digital media to an alternate media device in the environment.

The media devices 118 can include any type of audio and/or video media devices that playback digital media, such as any type of audio, video, or audio/video media, as well as any type of digital images. In this example, the computing device 102 may include the stored digital media 166 that is accessible for playback on one or more of the media devices 118 in the environment. For example, the digital media 166 that is accessible for playback from the computing device 102 may be audio digital media and/or video digital media, and the automation controller 136 can initiate to communicate the audio and/or digital media to an audio playback media device and/or to a video playback media device in the environment.

Alternatively or in addition, the digital media may be accessible from a network server device for playback on media device 118 in the environment 114, such as shown and described with reference to FIG. 6. The network-based (or cloud-based) digital media can be communicated from a network server device to a media device 118 for digital media playback of the digital media. In other media playback implementations, a discover and launch (DIAL) type protocol can be implemented for casting, where a user of the wireless device 104 selects media content for playback on a media device 118 in the environment, and the media content is then cast from the wireless device 104, as the digital media 166 from the computing device 102, or from a network server device to the media device 118 for the digital media playback in the environment.

Additionally, video digital media can be cast or communicated to a media device 118 for video media playback based on which way a smart display or other television device is facing, taking into consideration the orientation of the person in the environment. Utilizing the UWB ranging data and AoA techniques, as well as the sensors of a wireless device 104, the detected motions, and/or a captured image from the camera device 150 for example, the automation controller 136 can determine the direction that a user's phone is facing, and the most likely media device 118 to cast or communicate the digital media for media playback. The automation controller 136 can receive orientation information that indicates an orientation of the person in the environment, and initiate the communication of the digital media to the media device 118 that corresponds to the orientation of the person for viewing the digital media.

In implementations, the UWB radios 120, 122 in the environment 114, and the UWB ranging data 148, can provide the relative orientation between the UWB radios, as well as with additional sensors that indicate an orientation of the user who carries the wireless device 104 in the environment. For example, if the user carries the wireless device 104 in hand and is viewing the display screen of the device, then it is likely the UWB components of the device are facing the same or similar direction as the user, given the UWB antennas for AoA are positioned opposite the display in the device. Alternatively, if the wireless device 104 is carried in a pocket of the user, the display of the device likely faces outward and the device UWB components indicate that the user is facing in an opposite direction. The UWB antenna array in the wireless device 104, which is carried by a user, can be used as an indication of the orientation of the person in the environment, such as based on whether the user is facing normal to the device (0 degree angle), sideways to the device (90 degree angle), or facing away from the device (180 degree angle).

Other sensors of the device can also indicate a particular orientation of the wireless device 104 to the user, such as in a pocket and the device display is facing the body of the user, which would indicate that the UWB antenna array is pointed in the direction the user is moving. Alternatively, the device display may be facing outwards away from the body of the user, which would indicate that the UWB antenna array is pointed in an opposite direction to the vector of travel of the user. In other implementations utilizing sensors of the wireless device 104, the orientation of the user in the environment 114 may be determinable by the automation controller 136 based on user face detection, eye gaze detection with a camera of the device, and/or with other types of sensors that sense proximity of the user. The automation controller 136 can then initiate to cast or communicate the video digital media to a media device 118 for video media playback based on the user orientation and/or where the user is looking. Further, inertial measurement unit (IMU) sensors implemented in the wireless device 104, for example, can locally detect or capture motions or gestures for particular instances of initiating automation control, such as for media playback or home automation control of a home automation device or system.

Alternatively or in addition, the camera device 150 can be used to capture an image 152 of the environment, and the object detection module 154 utilized to determine the orientation of the user in the environment from the captured image. The automation controller 136 can receive the orientation information from the camera device 150 and/or from the object detection module 154. The automation controller 136 can also respond to detected user gesture motions, such as captured by the camera device 150 and/or by other cameras in the environment 114, to initiate digital media playback of the digital media on a particular media device 118.

In implementations, the mapping module 138 and/or the automation controller 136 can also determine the position of a person within a room of a building (e.g., the environment) that includes the location of the media device 118 for digital media playback of the digital media. Additionally, as the person moves the wireless device 104 (e.g., computing device 102) within the building environment, such as from room to room, the automation controller 136 can determine a subsequent position of the wireless device within a different room of the building, and transfer the casting or communication of the digital media to a different media device 118 in the different room for the digital media playback of the digital media, based on the determined subsequent position of the person in the environment relative to the location of the different media device.

The automation controller 136 can also maintain a priority casting list of selected media devices 118, and digital content, such as the digital media 166 (e.g., audio, video, and/or audio/video) stored on the computing device 102, can be queued for playback at the selected media devices 118 based on user location and/or orientation in the environment, the device position in the environment, the time of day, any other type of determined scenario, and/or based on determined user intent. These aspects can also include multi-device playlist management, such as for crowdsourced content with multiple mobile devices in proximity to audio playback speakers in an environment or environment region. In implementations, the automation controller 136 can auto-select the different media devices 118 based on the priority casting list of ordered and selected media devices in the environment.

The example computing device 102 also implements the automation controller 136 in aspects of environment dead zone determinations based on UWB ranging. The automation controller 136 is implemented by the computing device 102 (or wireless device 104) to determine coverage dead zones 164 in the environment, such as to determine where voice-over-IP (VOIP) or cellular calls are dropped. The automation controller 136 can also determine the coverage dead zones 164 where digital media, such as audio and/or video streaming media, does not playback on a media device 118 in the environment. The automation controller 136 can also determine locations in the environment 114 where motions (e.g., gestures) are not detectable in the environment due to lack of camera device coverage. In implementations, the automation controller 136 can determine or assess coverage dead zones 164 in the environment based on limited or no signal strength (e.g., received signal strength indicator (RSSI) measurements) and/or based on quality of service (QoS) metrics.

In aspects of the described techniques, the automation controller 136 can receive the UWB ranging data 148 from the UWB radios 120, 122 in the environment 114, and monitor locations of the respective devices in the environment. The automation controller 136 can also detect a loss of coverage by a device connected in the environment, and determine a coverage dead zone 164 within the environment at the location of the loss of coverage by the device based on the UWB ranging data. The loss of coverage by the device in the environment may be a voice-over-IP (VOIP) or cellular call dropped by the device. Alternatively, the loss of coverage may be detected by the automation controller as an interruption of streaming digital media to a media device 118. Further, the loss of coverage may include non-detectable motions in the environment due to a lack of camera coverage.

In implementations, the automation controller 136 can determine a coverage dead zone 164 based on a time-difference-of-arrival (TDoA) between the wireless device 104 and an access point (e.g., a router) in the environment, and the angle-of-arrival (AoA) to the access point. The automation controller 136 can also map the coverage dead zone 164 based on received signal strength indicator (RSSI) measurements and quality of service (QOS) metrics from the location of the loss of coverage by the device. This includes accounting for dropped coverage, such as when a voice-over-IP (VOIP) or cellular call is dropped by the device, or is likely to be dropped by the device in the coverage dead zone. As noted below, the device can be triggered to switch from VoIP to cellular (or vice-versa) to maintain a wireless communication connection in or around a detected coverage dead zone.

In aspects of the described techniques, the device in the environment 114 that loses coverage may be a mobile wireless device, such as carried in the environment by a user of the device, and the automation controller 136 can determine the coverage dead zone 164 based on an orientation of the wireless device at the location of the loss of coverage. Further, the automation controller 136 can detect that the wireless device is wirelessly connected for communication in the environment and moving in a direction toward a coverage dead zone, and initiate the wireless device switching from VoIP to cellular to maintain the communication in the coverage dead zone.

Figure 2:
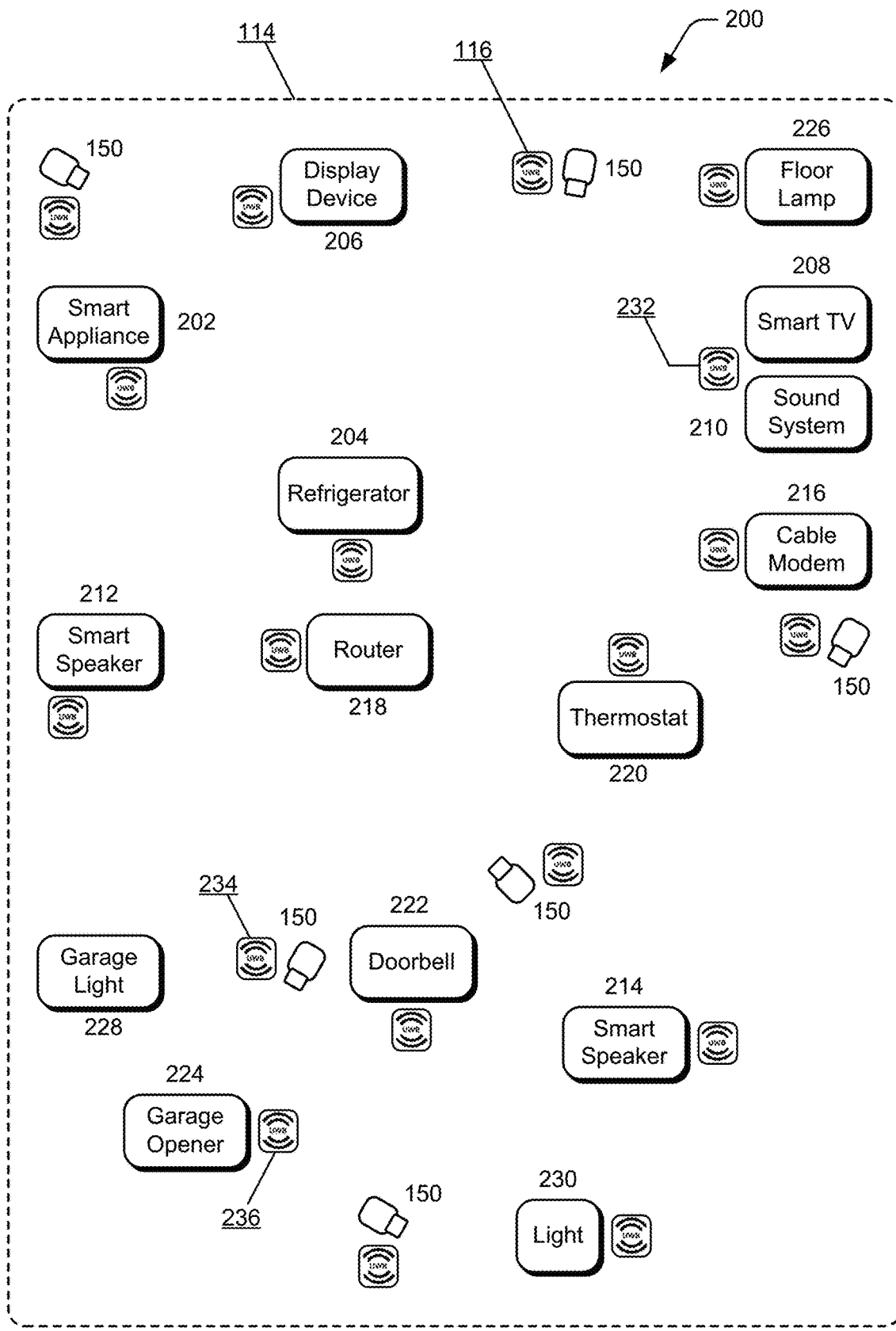
FIGS. 2-4 illustrate examples of environment mapping generated in accordance with one or more implementations as described herein.

FIG. 2 illustrates an example 200 of the environment mapping 158 showing the location of various media devices, objects, and/or other devices in the environment 114, such as a location association map generated by the mapping module 138 implemented by the computing device 102, as shown and described with reference to FIG. 1. In this example 200 of the environment 114, the position of each of the devices and other objects is shown relative to each other in the environment, as determined based on the precise location positioning capabilities of UWB utilizing the UWB tags 116. The environment includes examples of the devices 124, such as a smart appliance 202 and refrigerator 204, a cable modem 216 and router 218, a thermostat 220 and smart doorbell 222, and a garage door opener 224. The environment 114 also includes examples of the media devices 118, such as a display device 206, a smart TV 208 and sound system 210, and smart speakers 212, 214. The environment 114 also includes examples of other objects 126, such as a floor lamp 226, a garage light 228, and an outdoor light 230. The environment 114 also includes several examples of camera devices 150 positioned at various locations throughout the environment.

In this example 200 of environment mapping, the relative locations of the media devices, objects, and other devices to each other are shown in the environment, without walls of the building, such as in a home environment. In an aspect of the environment mapping, it should be noted that one UWB tag can be associated with more than one object and/or device in the environment, and can be labeled accordingly to provide the user a meaningful identifier that represents the combined objects and/or devices. For example, the UWB tag 232 is positioned for association with both the smart TV 208 and the sound system 210, and the UWB tag may be identified as "entertainment center." Further, although the illustrated examples may generally indicate an overall one-to-one correspondence between the UWB tags 116 and devices in the environment 114, there is no such requirement for implementation of the various techniques described in. For example, a room, region, or floor of the environment (e.g., a home or business environment) may have several fewer UWB tags than devices. In implementations, a small number of the UWB tags 116 (e.g., three or four per region or floor of the environment) may sufficiently cover the area.

In another aspect of the environment mapping, two or more of the UWB tags can be used to associate and locate objects that are not tagged in their spatial location. For example, the garage light 228 does not have an associated UWB tag. However, the two UWB tags 234, 236 (e.g., in the garage) can be used to determine the relative position of the garage light 228 in the environment for spatial awareness. The associated camera device 150 may also be used to capture an environment image 152 of the region (e.g., in the garage), and the environment image is used to further determine the relative position of the garage light 228 in the environment for spatial awareness.

Figure 3:
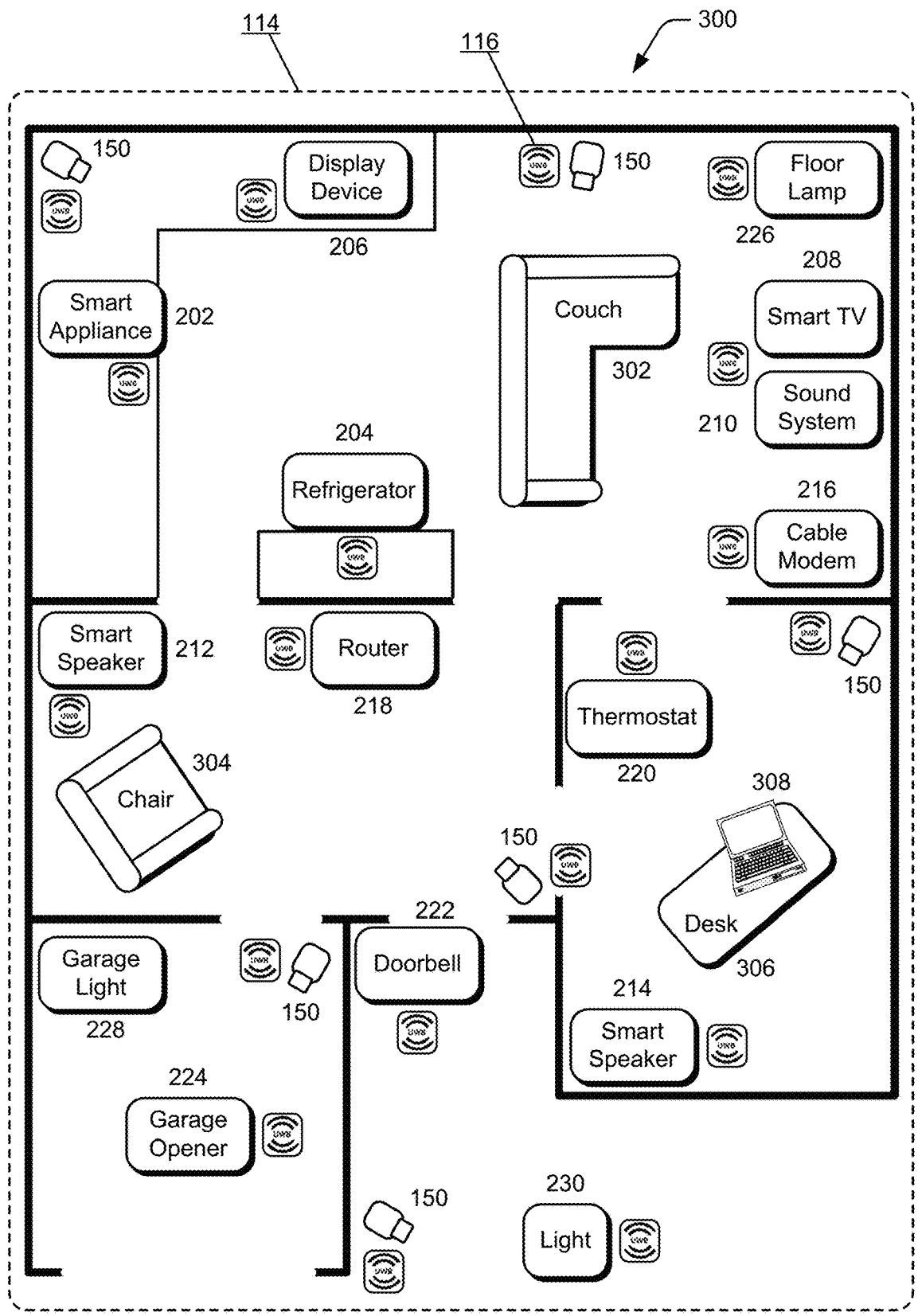

FIG. 3 similarly illustrates an example 300 of the environment mapping 158 showing the location of the media devices, objects, and/or other devices in the environment, such as generated by the mapping module 138 implemented by the computing device 102, as shown and described above with reference to FIGS. 1 and 2. Further, in this example 300 of a building environment, such as in a smart home implementation, the mapping module 138 generates the environment mapping of the media devices 118, other devices 124, and/or the objects 126 in the environment 114 based on the identified objects and/or the devices in the environment, as determined by the object detection module 154 from captured environment images 152. The various camera devices 150 positioned at locations throughout the environment 114 can be used to capture the environment images 152 of the different regions of the environment.

The mapping module 138 generates the environment mapping 158 as a floor plan of the building, including the locations of the objects 126, media devices 118, and/or other devices 124 in the building, with the floor plan including positions of walls of the building as determined from the captured environment images 152. The environment mapping shows the position of each of the devices and objects relative to each other, as well as the walls of the environment, which provides a more detailed spatial context. In addition to the media devices 118, objects 126, and other devices 124 shown in the environment mapping in FIG. 2, this example 300 also includes other objects determined from the captured environment images 152. For example, the mapped environment also includes the location and position of a couch 302, a chair 304, and a desk 306 in various rooms of the home environment.

Additionally, a UWB-enabled laptop computing device 308 has been added into the environment, and the laptop computing device communicates via a UWB radio with the UWB tags 116 and other UWB-enabled devices in the environment. The laptop computing device 308 can be implemented as an example of the computing device 102, which is shown and described with reference to FIG. 1. Notably, the laptop computing device 308 can implement the mapping module 138 to facilitate mapping the objects and/or devices in the environment 114, based on the locations and relative positions of each of the UWB tags. The wireless UWB communications for mapping objects and/or devices in the environment 114 are similar between the UWB tags and/or UWB-enabled devices in the environment.

Figure 4:
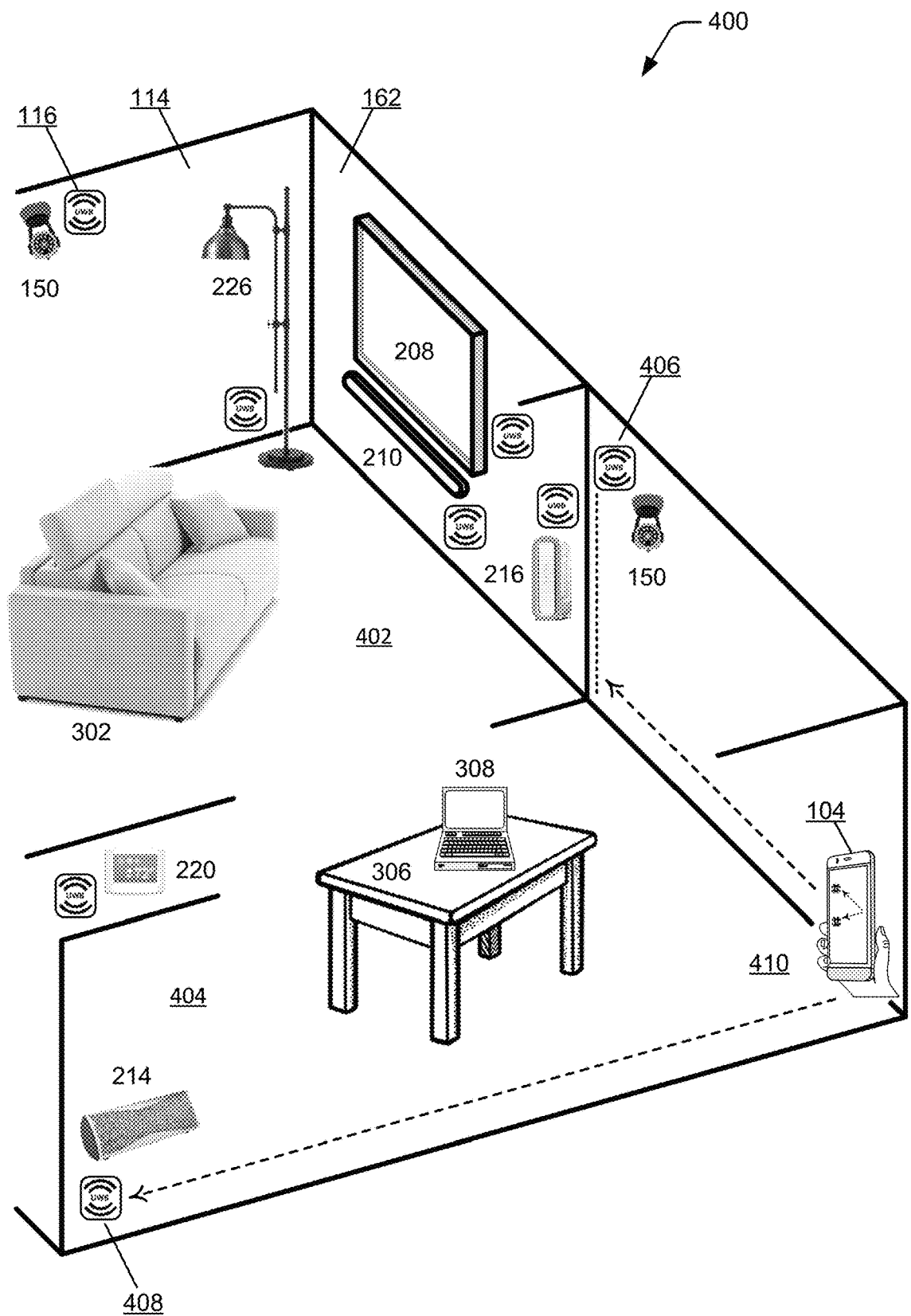

FIG. 4 illustrates an example 400 of the environment mapping 158 as an environment depth map, as described herein. The single-elevation floorplan in the examples of environment mapping shown in FIGS. 2 and 3 may also be generated by the mapping module 138 as a multi-elevation building or home environment. Notably, the system of UWB tags 116 and UWB radios 120, 122 also provides for z-elevation differentiation using the precise location positioning capabilities of UWB for a three-dimension coordinate mapping of a multi-elevation environment. In this example 400, a portion of the environment mapping 158 shown in FIG. 3 is recreated and shown as the environment depth map.

The portion of the environment 114 shown in the environment depth map shows the relative locations of the media devices 118, objects 126, and other devices 124 to each other in various rooms of the home environment. For example, a living area 402 includes a camera device 150, the smart TV 208 and sound system 210, the cable modem 216, the floor lamp 226, and the respective UWB tags 116 and/or UWB radios that are associated with the devices and objects. Similarly, an office area 404 includes a camera device 150, the smart speaker 214, the desk 306, the laptop computing device 308, and the respective UWB tags 116 and/or UWB radios that are associated with the objects and devices.

This example 400 of the environment depth map also illustrates environment dimensioning utilizing existing UWB tags 116 and/or placing additional UWB tags in the environment 114. For example, dimensions of the office area 404 can be measured using the precision accuracy of UWB based on the UWB tags 406, 408 in two corners of the room, along with the wireless device 104 communicating with the UWB radios 122 of the UWB tags from another corner of the room at 410 to determine the length and width of the room. Additionally, by utilizing more of the UWB tags 116 in the environment 114 and/or by altering the placement of the wireless device 104, the area and volume of regions in the environment can be determined, as well as measurements and dimensions of objects in the environment. Taken in conjunction with environment images 152 captured by one or more of the camera devices 150, surface areas of walls and floors can be determined, such as for determining the square footage for flooring and painting projects, as well as for virtual modeling and/or remodeling applications by placing objects in a viewfinder of the wireless device 104 to assess their appearance in the environment.

Additionally, AR overlays and enhancements can be generated for an AR-enhanced depth map as a virtual model of the environment, which can be displayed in an enhanced user interface on the display screen 106 of the wireless device 104. The object and environment dimensioning and measurements of objects 126 can be used to provide calibration inputs to the AR-enhanced depth map.

Figure 5:
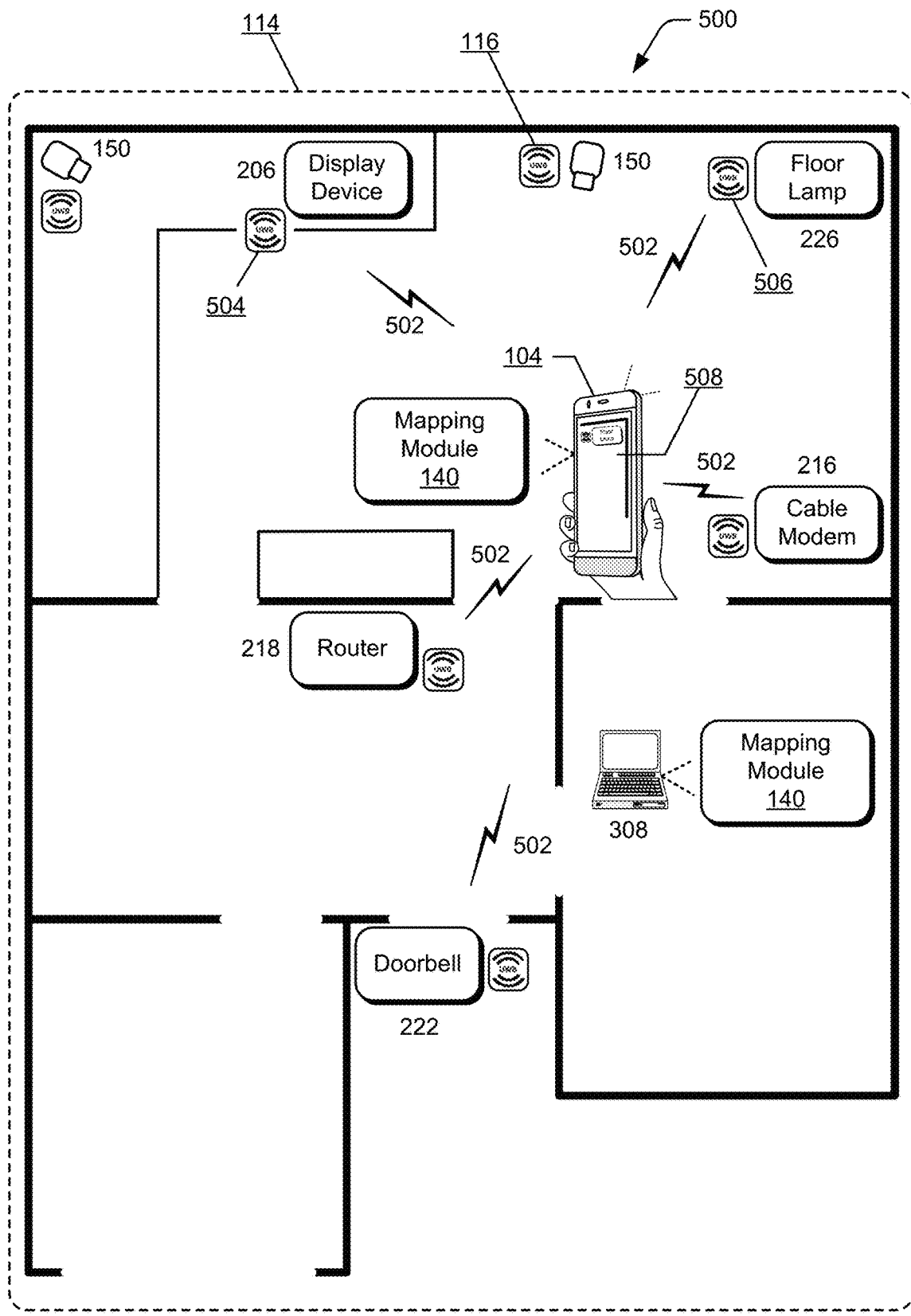
FIG. 5 illustrates examples of UWB tags and devices location association in accordance with one or more implementations described herein.

FIG. 5 illustrates examples 500 of UWB tags and devices location association, as described herein. A portion of the example of the environment 114 shown in FIG. 3 is further illustrated with additional example features of the mapping module 138, as implemented in a computing device 102, such as the wireless device 104 (e.g., a mobile phone or other device) in the environment. In these examples 500, the wireless device 104 communicates via the UWB radio 132 with the UWB tags 116 and UWB radios 120, 122 in the environment. Similarly, the wireless device 104 can also communicate via a Bluetooth radio and/or a Wi-Fi radio with the media devices 118 and/or the other devices 124 in the environment, such as the display device 206, the cable modem 216, the router 218, the smart doorbell 222, and the laptop computing device 308, to name a few. Although these examples 500 are described with reference to the wireless device 104 implementing the mapping module 138, it should be noted that the laptop computing device 308 may also implement the mapping module 138, and operate independently or in conjunction with the instantiation of the mapping module as implemented by the wireless device.

In an example use case, a user can start the mapping module 138 as an application on the wireless device 104 (e.g., a mobile phone), as well as place the UWB tags 116 for association with any of the media devices 118, objects 126, and/or other devices 124 in the environment. An operational mode of the UWB tags 116 can be enabled, as well as an advertising mode, discoverable mode, or other type of operational mode initiated on the other devices 124 and/or media devices 118. The UWB tags 116, as well as the wireless device 104, can then scan for the Bluetooth or BLE advertising and/or other identifiable RF packets advertised as messages from the devices. The mapping module 138 can initiate to query the UWB tags 116 for a BLE MAC ADDR report, device name, RSSIs, and any other type of device identifying information.

Additionally, the UWB tags 116 can generate an ordered list of proximate devices 124 and/or media devices 118 based on RSSI and/or reported transmission power to assess which of the devices is the closest to a particular UWB tag. The mapping module 138 implemented by the wireless device 104 can also compare the UWB tag reports against its own database of device identifying information 140 and UWB tag identifiers 142. Additionally, the mapping module 138 can then compare the signal path loss of the signals received from the UWB tags and other UWB-enabled devices to determine which of the UWB tags and devices are proximate each other based on similar signal path loss. Notably, a user can override any of the UWB tag and device determined associations, either by a UWB tag itself or by the mapping module, and the user can then designate which one of the UWB tags 116 is associated with a particular device or object.

In implementations, some reported BLE MAC ADDRs may be random addresses due to the BLE privacy feature, and are unresolvable by a UWB tag 116 without an identity resolving key that is otherwise available on the wireless device 104, given that the wireless device has been previously paired with the devices using random addressing. For these obscure BLE MAC ADDRs due to random addresses, or unpaired devices not transmitting identifiable information, the wireless device 104 can disambiguate, communicate the appropriate address to the UWB tag 116, and update the database for the UWB tag identifiers 142. A UWB tag identifier 142 can be generated automatically by the mapping module 138, or optionally, a user of the device may be prompted via the user interface 160 to approve or change the generated UWB tag identifiers 142 and designated associations with objects and/or smart devices. For further disambiguation of the UWB tags 116 associated with the media devices 118, objects 126, and/or other devices 124 in the environment 114, a camera device 150 can be used to capture the environment image 152. The object detection module 154 can then determine the location of the devices and/or objects in the environment, and the location information is used by the mapping module 138 to generate the environment mapping.

The mapping module 138 receives (via wireless device 104) the Bluetooth or BLE advertised communications 502 from the UWB tags 116 and other UWB radios of devices in the environment 114. The mapping module 138 can then correlate a UWB tag 116 with a nearby device based on RSSI measurements of the Bluetooth or BLE advertised communications 502 from the UWB tags and UWB radios of the devices. For example, the wireless device 104 can receive advertised signals from a UWB tag 504 and the smart display device 206, and the mapping module 138 compares the signal path loss from the received signals to determine that the UWB tag 504 and the smart display device 206 are proximate each other based on similar signal path loss. The mapping module 138 can then associate the UWB tag 504 with the nearby smart display device 206, and communicate the association back to the UWB tag 504, such as via in-band UWB communications.

In a similar implementation, the mapping module 138 receives (via wireless device 104) the Bluetooth or BLE advertised communications 502 from a UWB tag 506 that is proximate an object, such as the floor lamp 226 in the environment 114. The mapping module 138 can utilize the received signals and a captured environment image 152 to determine that the UWB tag 506 is proximate the floor lamp 226, associate the UWB tag 506 with the nearby object, and communicate the association back to the UWB tag 506, such as via in-band UWB communications. As noted above, a user of the wireless device 104 can override any of the UWB tag and device determined associations by the mapping module, and the user can designate any one of the UWB tags as being associated with a particular device or other object.

Figure 6:
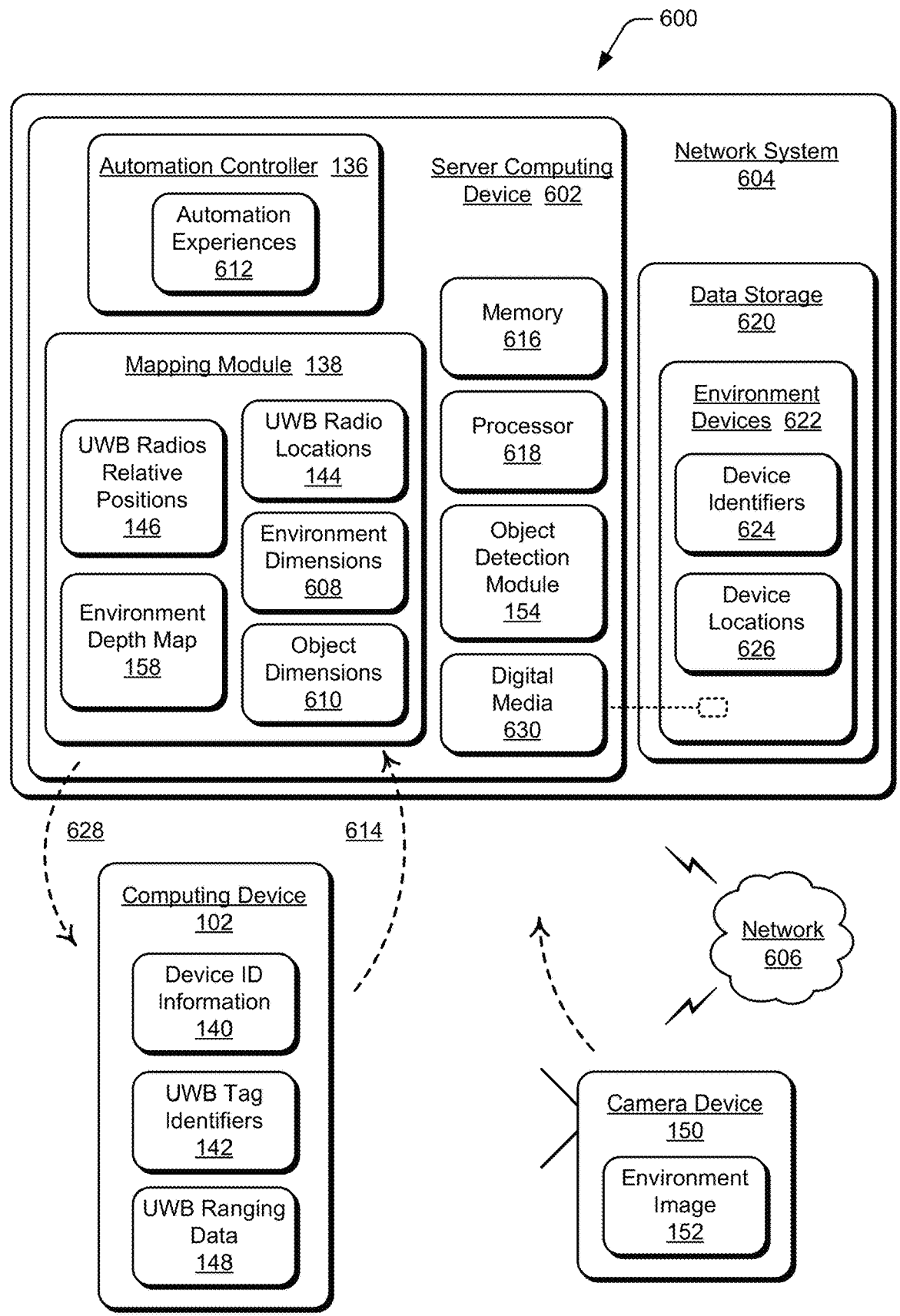
FIG. 6 illustrates an example cloud-based system in which aspects and features of a UWB automation experiences controller and environment dead zone determinations can be implemented.

FIG. 6 illustrates an example of a cloud-based system 600 in which aspects and features of a UWB automation experiences controller and environment dead zone determinations can be implemented. The example system 600 includes the computing device 102 and the camera device 150, such as shown and described with reference to FIG. 1. In this example system 600, the computing device 102 and the camera device 150 are implemented to access and communicate with a server computing device 602 of a network system 604, such as via a communication network 606. The server computing device 602 implements an instantiation of the mapping module 138 to determine the locations 144 of each of the UWB radios 120, 122 in the environment 114, determine the relative positions 146 of each of the UWB radios with respect to each other, and generate environment mapping. The mapping module 138 is also implemented to determine environment dimensions 608 and the object dimensions 610 of the objects in the environment 114 based on the location and a relative position of each tagged object and non-tagged object in the environment.

The server computing device 602 can also implement an instantiation of the object detection module 154 to identify the objects, media devices, and/or other devices in regions of the environment from the environment images 152 captured by the camera devices 150 positioned in the environment. The server computing device 602 can also implement an instantiation of the automation controller 136 to manage, coordinate, and control the automation experiences 612 for the computing device 102 in the environment 114, as described with reference to FIG. 1.

The camera device 150 can upload the environment images 152 to the network system 604 via the communication network 606. Similarly, the computing device 102 can upload the received device identifying information 140, the UWB tags identifiers 142, the UWB ranging data 148, and any other type of environment data to the network system 604 for processing and evaluation by the mapping module 138 that is implemented by the server computing device 602. The upload of data from the camera device 150 and/or from the computing device 102 to the network system may be automatically controlled by the respective devices, or optionally, initiated by a user of the devices. The network system 604 can receive the uploaded environment data as inputs to the mapping module 138 from the computing device 102 and/or from the camera device 150, as indicated at 614 via the communication network 606.

Any of the devices, applications, modules, servers, and/or services described herein can communicate via the communication network 606, such as for data communication between the computing device 102 and the network system 604, and for data communication between the camera device 150 and the network system. The communication network 606 can be implemented to include a wired and/or a wireless network. The communication network 606 can also be implemented using any type of network topology and/or communication protocol, and can be represented or otherwise implemented as a combination of two or more networks, to include IP-based networks and/or the Internet. The communication network 606 may also include mobile operator networks that are managed by a mobile network operator and/or other network operators, such as a communication service provider, mobile phone provider, and/or Internet service provider.

In this example cloud-based system 600, the network system 604 is representative of any number of cloud-based access sites that provide a service and/or from which data and information is available, such as via the Internet, for on-line and/or network-based access. The network system 604 can be accessed on-line, and includes the server computing device 602, which is representative of one or more hardware server devices (e.g., computing devices, network server devices) that may be implemented at the network system. The server computing device 602 includes memory 616 and a processor 618, and may include any number and combination of different components as further described with reference to the example device shown in FIG. 9.

In this example cloud-based system 600, the server computing device 602 implements the mapping module 138 and/or the object detection module 154, such as in software, in hardware, or as a combination of software and hardware components, generally as shown and described with reference to FIG. 1. In this example, the mapping module 138 and the object detection module 154 are implemented as software applications or modules, such as executable software instructions (e.g., computer-executable instructions) that are executable with a processing system (e.g., the processor 618) of the server computing device 602 to implement the techniques described herein. The mapping module 138 and the object detection module 154 can be stored on computer-readable storage media, such as any suitable memory device (e.g., the device memory 616) or on electronic data storage implemented in the server computing device 602 and/or at the network system 604.

The network system 604 may include multiple data storage, server devices, and applications, and can be implemented with various components as further described with reference to the example device shown in FIG. 9. The network system 604 also includes data storage 620 that may be implemented as any suitable memory or electronic data storage for network-based data storage. The data storage 620 is utilized at the network system 604 to maintain any type of environment data and device information, such as in a database of environment devices 622, with associated device identifiers 624 and device locations 626 in the environment. The device locations 626 may also include Global Positioning System (GPS) data that indicates the locations of the objects 126, the media devices 118, and/or the other devices 124 in the environment 114, such as in a smart home environment.

The data storage 620 can also be utilized at the network system 604 to maintain any type of the uploaded environment data, such as the uploaded environment images 152 and/or the various UWB radios locations 144 in the environment 114, the UWB radios relative positions 146 with respect to each other, and the environment mapping 158 determined by the mapping module 138, as shown and described with reference to FIGS. 1-5. The environment and device information determined by the mapping module 138 and/or by the object detection module 154 can then be communicated as feedback from the network system 604 to the computing device 102, as indicated at 628 via the communication network 606. Additionally, the data storage 620 may be used to maintain digital media 630 that is accessible the network system 604, and communicated by the server computing device 602 for playback on a media device 118 in the environment 114, such as when initiated by the automation controller 136 for playback of the digital media.

Example methods 700 and 800 are described with reference to respective FIGS. 7 and 8 in accordance with implementations for a UWB automation experiences controller and environment dead zone determinations. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
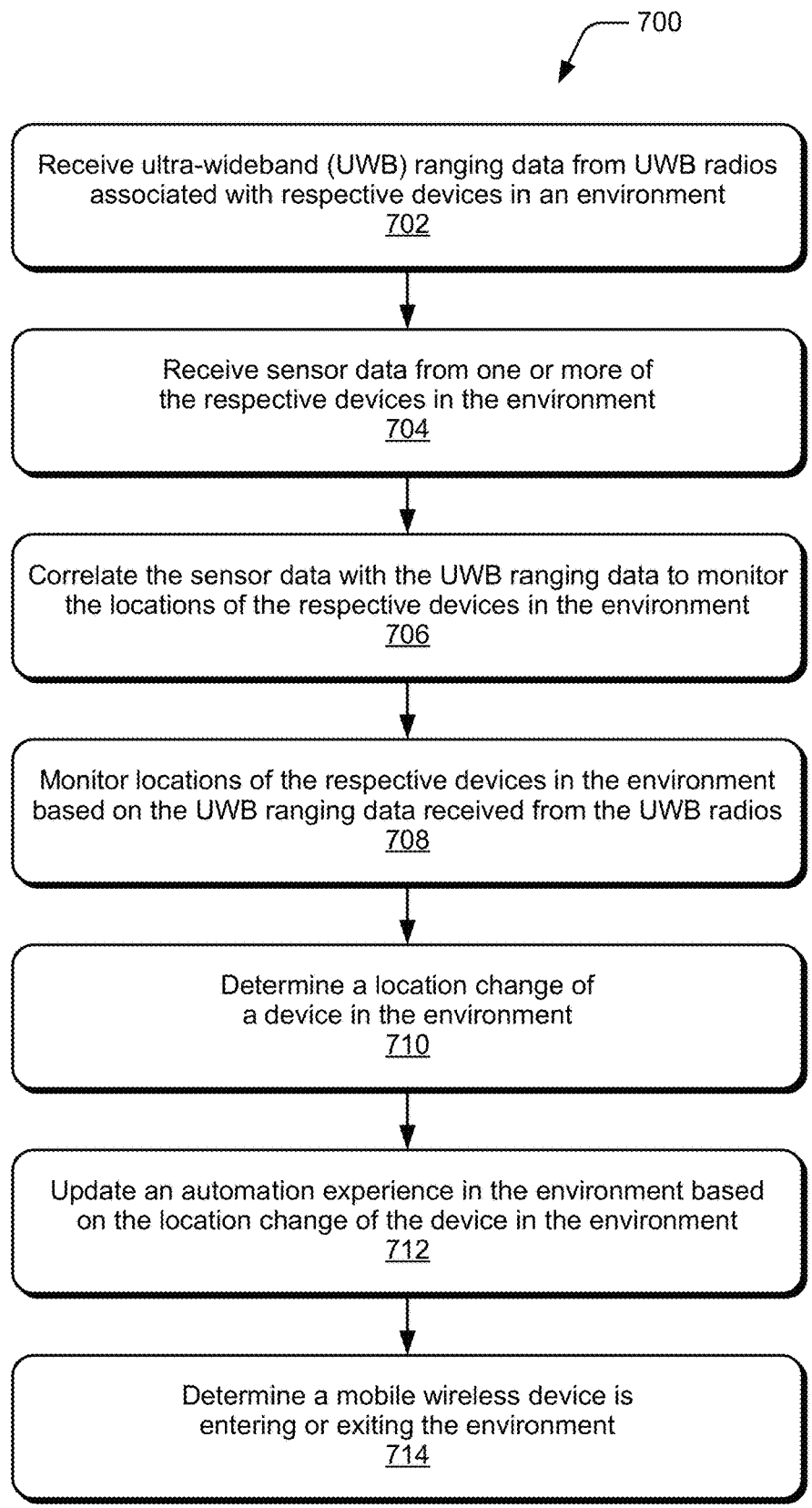
FIG. 7 illustrates an example method for UWB automation experiences controller in accordance with one or more implementations of the techniques described herein.

FIG. 7 illustrates example method(s) 700 for a UWB automation experiences controller, and is generally described with reference to an automation controller implemented by a computing device. The order in which the method is described is not intended to be construed as a limitation, and any number or combination of the described method operations can be performed in any order to perform a method, or an alternate method.

At 702, ultra-wideband (UWB) ranging data is received from UWB radios associated with respective devices in an environment. For example, the computing device 102 communicates, generally by wireless connection, with the UWB radios 122 of the UWB tags 116, with the UWB radios 120 of the media devices 118, and/or to other UWB-enabled devices for UWB communication in the environment 114. Generally, the environment 114 includes the computing device 102, wireless device 104, media devices 118, the UWB tags 116, and/or other UWB-enabled devices implemented with a UWB radio for communication utilizing UWB, as well as any number of the other types of electronic, computing, and/or communication devices 108 described herein. The automation controller 136 implemented by the computing device 102 receives the UWB ranging data 148 from the UWB radios 120, 122 in the environment.

At 704, sensor data is received from one or more of the respective devices in the environment. For example, the automation controller 136 implemented by the computing device 102 receives sensor data from one or more of the devices in the environment 114. In implementations, the sensor data may be a captured image 152 of the environment 114 captured with a camera device 150 in the environment. The sensor data may also include motion and gesture indications as detected by sensors implemented in a device, such as IMU sensors implemented in the wireless device 104, for example, that locally detect or capture motions or gestures for particular instances of initiating automation control. In implementations, the sensor data may also be orientation data that indicates an orientation of the wireless device 104 in the environment, motion data from detected motions by camera devices in the environment, and/or global positioning system (GPS) data from one or more of the respective devices in the environment.

At 706, the sensor data is correlated with the UWB ranging data to monitor the locations of the respective devices in the environment. For example, the automation controller 136 implemented by the computing device correlates the sensor data, such as the GPS data, with the UWB ranging data 148 to monitor the locations of the respective devices in the environment.

At 708, locations of the respective devices in the environment are monitored based on the UWB ranging data received from the UWB radios. For example, the automation controller 136 implemented by the computing device 102 monitors the locations of the respective devices in the environment based on the UWB ranging data 148. In implementations, location information can be received for each of the devices in the environment based on a position of the UWB radio associated with a respective device. For example, the automation controller 136 implemented by the computing device 102 also receives location information from the mapping module 138 for each of the devices in the environment 114 based on a position of the UWB radio 120, 122 that is associated with a respective media device 118 or UWB tag 116.

At 710, a location change of a device in the environment is determined. For example, the automation controller 136 implemented by the computing device 102 determines a device location change 162 of a device in the environment 114, such as based on the UWB ranging data 148 and/or the other sensor data. A user may carry the wireless device 104 in the environment 114, and the automation controller 136 can determine when the wireless device enters or exits the environment, and where the device is as the user walks through the environment. The automation controller 136 can track the movements and/or orientation of a user (e.g., the wireless device 104), such as when the user walks through or around in the environment, such as from room to room in a building.

At 712, an automation experience in the environment is updated based on the location change of the device in the environment. For example, the automation controller 136 implemented by the computing device 102 updates an automation experience in the environment based on a monitored interaction and/or the location change 162 of the device in the environment. The automation controller 136 updating the automation experience can include initiating digital media playback at a selected media device 118 in the environment. For example, the automation experience may be streaming digital media to a media device 118 in the environment 114, and updating the automation experience includes initiating a transfer of the streaming digital media to an alternate media device in the environment. The automation controller 136 can be implemented to queue digital media for playback at selected media devices 118 in the environment, and initiate digital media playback at a selected media device.

Generally, the automation controller 136 updating the automation experience in the environment can be based in part on a captured image 152 of the environment, based on the orientation of the device in the environment, and/or based on the motion data associated with detected motions in the environment. Based on detected locations, motions, device interactions, and/or user and device orientations, the automation controller 136 can initiate, update, interact with, and/or control any type of home automation device, IoT device, and/or home automation system in the environment. For example, the automation controller 136 can monitor user and/or wireless device movements in the environment, and correspondingly, modify HVAC settings, turn-on and turn-off lights and devices, update a media experience, and/or any other type of environment automation experience.

At 714, a mobile wireless device is determined as entering or exiting the environment. For example, the automation controller 136 may be implemented by the wireless device 104 in the environment, and the automation controller 136 determines when the wireless device enters or exits the environment.

Figure 8:
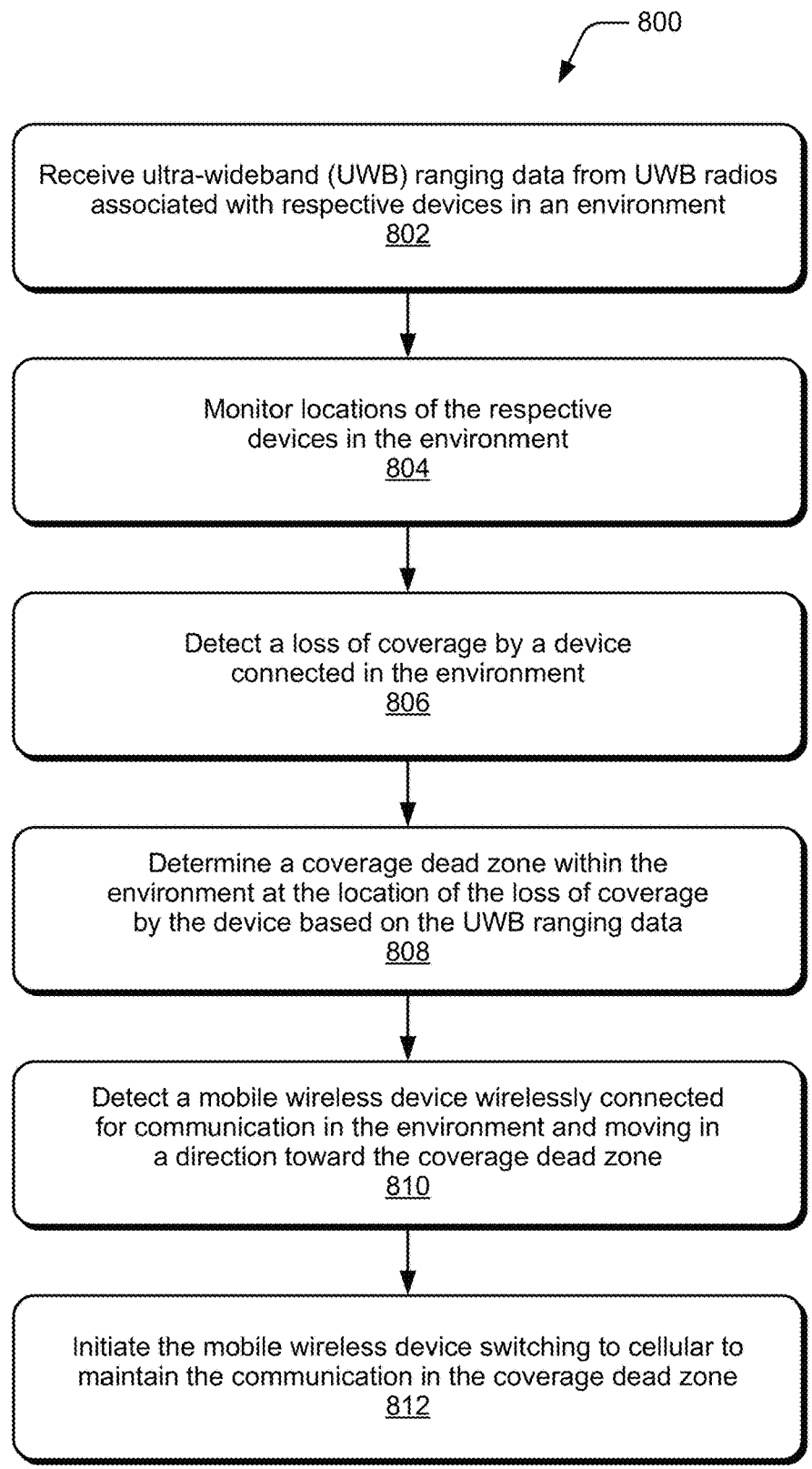
FIG. 8 illustrates an example method for environment dead zone determination based on UWB ranging in accordance with one or more implementations of the techniques described herein.

FIG. 8 illustrates example method(s) 800 for environment dead zone determination based on UWB ranging, and is generally described with reference to an automation controller implemented by a computing device. The order in which the method is described is not intended to be construed as a limitation, and any number or combination of the described method operations can be performed in any order to perform a method, or an alternate method.

At 802, ultra-wideband (UWB) ranging data is received from UWB radios associated with respective devices in an environment. For example, the computing device 102 communicates, generally by wireless connection, with the UWB radios 122 of the UWB tags 116, with the UWB radios 120 of the media devices 118, and/or to other UWB-enabled devices for UWB communication in the environment 114. Generally, the environment 114 includes the computing device 102, wireless device 104, media devices 118, the UWB tags 116, and/or other UWB-enabled devices implemented with a UWB radio for communication utilizing UWB, as well as any number of the other types of electronic, computing, and/or communication devices 108 described herein. The automation controller 136 implemented by the computing device 102 receives the UWB ranging data 148 from the UWB radios 120, 122 in the environment.

At 804, locations of the respective devices in the environment are monitored. For example, the automation controller 136 implemented by the computing device 102 monitors the locations of the respective devices in the environment based on the UWB ranging data 148. In implementations, location information can be received for each of the devices in the environment based on a position of the UWB radio associated with a respective device. For example, the automation controller 136 implemented by the computing device 102 also receives location information from the mapping module 138 for each of the devices in the environment 114 based on a position of the UWB radio 120, 122 that is associated with a respective media device 118 or UWB tag 116.

At 806, a loss of coverage by a device connected in the environment is detected. For example, the automation controller 136 implemented by the computing device 102 detects a loss of coverage by a device connected in the environment 114, such as a voice-over-IP (VOIP) call dropped by the device, a cellular call dropped by the device, or an interruption of streaming digital media to a media device 118 in the environment. The loss of coverage may also include non-detectable motions in the environment due to a lack of camera coverage.

At 808, a coverage dead zone within the environment is determined at the location of the loss of coverage by the device based on the UWB ranging data. For example, the automation controller 136 implemented by the computing device 102 determines a coverage dead zone 164 within the environment at the location of the loss of coverage by the device based on the UWB ranging data. The automation controller 136 can determine the coverage dead zone 164 based on a time-difference-of-arrival (TDoA) between the device and an access point (e.g., a router) in the environment, and the angle-of-arrival (AoA) to the access point. The automation controller 136 can determine the coverage dead zone 164 based on a received signal strength indicator (RSSI) measurements and/or quality of service (QOS) metrics from the location of the loss of coverage by the device. The device that loses coverage in the environment may be the wireless device 104, and the automation controller 136 determines the coverage dead zone 164 based on an orientation of the wireless device at the location of the loss of coverage.

At 810, a mobile wireless device is detected as wirelessly connected for communication in the environment and moving in a direction toward the coverage dead zone. For example, the automation controller 136 implemented by the computing device 102 detects that the wireless device 104 is wirelessly connected for communication in the environment 114 and moving in a direction toward a coverage dead zone 164.

At 812, the mobile wireless device is initiated for switching to cellular to maintain the communication in the coverage dead zone. For example, the automation controller 136 implemented by the computing device 102 communicates to the wireless device 104 to initiate the device switching from VoIP to cellular to maintain the communication in the coverage dead zone.

Figure 9:
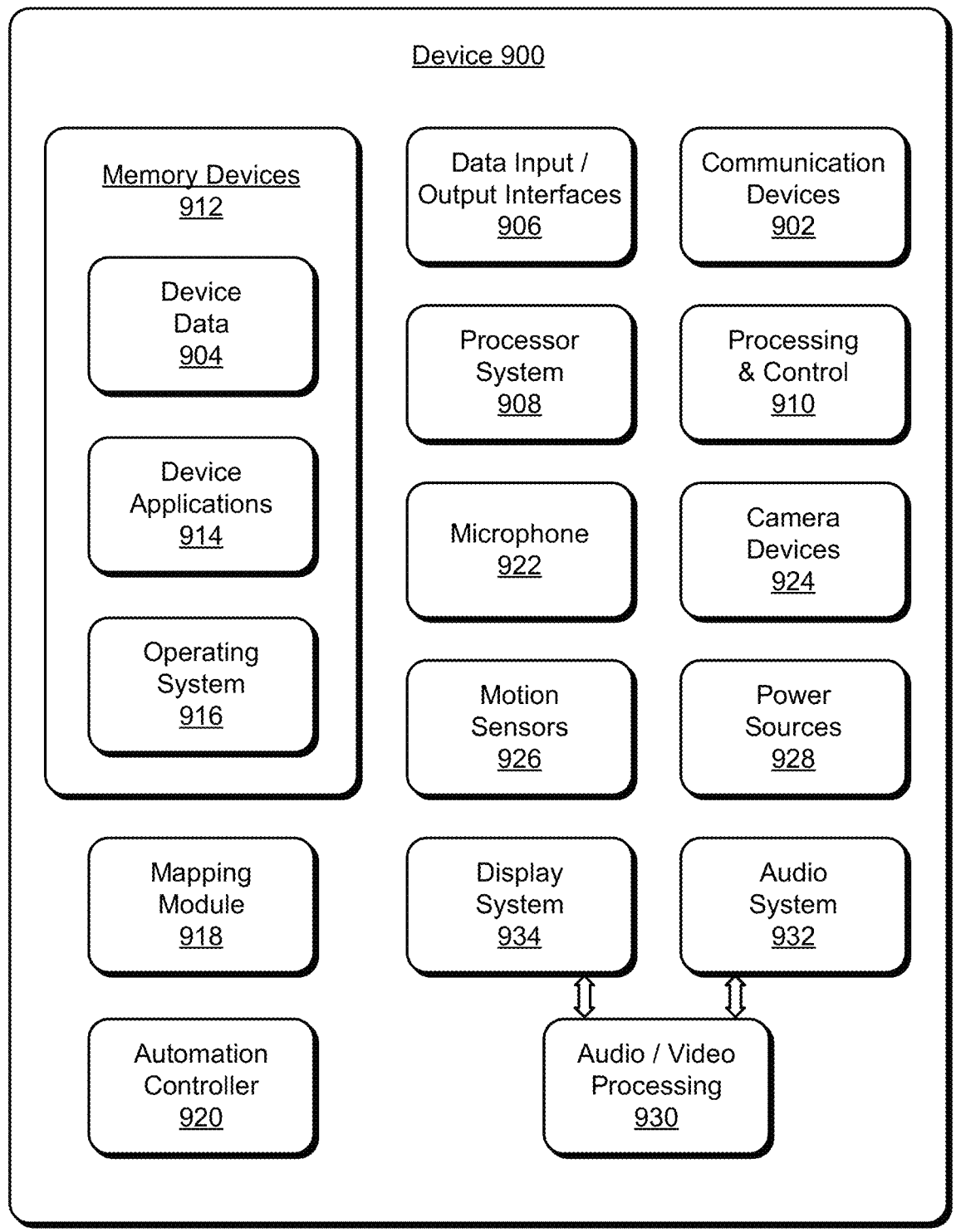
FIG. 9 illustrates various components of an example device that can be used to implement the techniques for a UWB automation experiences controller and environment dead zone determinations as described herein.

FIG. 9 illustrates various components of an example device 900, which can implement aspects of the techniques and features for a UWB automation controller and environment dead zone determinations, as described herein. The example device 900 can be implemented as any of the devices described with reference to the previous FIGS. 1-8, such as any type of a wireless device, mobile device, mobile phone, flip phone, client device, companion device, paired device, display device, tablet, computing, communication, entertainment, gaming, media playback, and/or any other type of computing and/or electronic device. For example, the computing device 102, the camera device 150, and/or a UWB tag 116 described with reference to FIGS. 1-8 may be implemented as the example device 900.

The example device 900 can include various, different communication devices 902 that enable wired and/or wireless communication of device data 904 with other devices. The device data 904 can include any of the various devices data and content that is generated, processed, determined, received, stored, and/or communicated from one computing device to another. Generally, the device data 904 can include any form of audio, video, image, graphics, and/or electronic data that is generated by applications executing on a device. The communication devices 902 can also include transceivers for cellular phone communication and/or for any type of network data communication.

The example device 900 can also include various, different types of data input/output (I/O) interfaces 906, such as data network interfaces that provide connection and/or communication links between the devices, data networks, and other devices. The I/O interfaces 906 can be used to couple the device to any type of components, peripherals, and/or accessory devices, such as a computer input device that may be integrated with the example device 900. The I/O interfaces 906 may also include data input ports via which any type of data, information, media content, communications, messages, and/or inputs can be received, such as user inputs to the device, as well as any type of audio, video, image, graphics, and/or electronic data received from any content and/or data source.

The example device 900 includes a processor system 908 of one or more processors (e.g., any of microprocessors, controllers, and the like) and/or a processor and memory system implemented as a system-on-chip (SoC) that processes computer-executable instructions. The processor system 908 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 910. The example device 900 may also include any type of a system bus or other data and command transfer system that couples the various components within the device. A system bus can include any one or combination of different bus structures and architectures, as well as control and data lines.

The example device 900 also includes memory and/or memory devices 912 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 912 include volatile memory and non-volatile memory, fixed and removable media devices, and any suitable memory device or electronic data storage that maintains data for computing device access. The memory devices 912 can include various implementations of random-access memory (RAM), read-only memory (ROM), flash memory, and other types of storage media in various memory device configurations. The example device 900 may also include a mass storage media device.

The memory devices 912 (e.g., as computer-readable storage memory) provide data storage mechanisms, such as to store the device data 904, other types of information and/or electronic data, and various device applications 914

(e.g., software applications and/or modules). For example, an operating system 916 can be maintained as software instructions with a memory device 912 and executed by the processor system 908 as a software application. The device applications 914 may also include a device manager, such as any form of a control application, software application, signal-processing and control module, code that is specific to a particular device, a hardware abstraction layer for a particular device, and so on.

In this example, the device 900 includes a mapping module 918, as well as an automation controller 920 that implements various aspects of the described features and techniques for a UWB automation experiences controller and environment dead zone determinations. The mapping module 918 and the automation controller 920 can each be implemented with hardware components and/or in software as one of the device applications 914, such as when the example device 900 is implemented as the computing device 102 and/or the camera device 150 described with reference to FIGS. 1-8. An example of the mapping module 918 includes the mapping module 138 that is implemented by the computing device 102, such as a software application and/or as hardware components in the computing device. An example of the automation controller 920 includes the automation controller 136 that is implemented by the computing device 102, such as a software application and/or as hardware components in the computing device. In implementations, the mapping module 918 and/or the automation controller 920 may include independent processing, memory, and logic components as a computing and/or electronic device integrated with the example device 900.

The example device 900 can also include a microphone 922 and/or camera devices 924, as well as motion sensors 926, such as may be implemented as components of an inertial measurement unit (IMU). The motion sensors 926 can be implemented with various sensors, such as a gyroscope, an accelerometer, and/or other types of motion sensors to sense motion of the device. The motion sensors 926 can generate sensor data vectors having three-dimensional parameters (e.g., rotational vectors in x, y, and z-axis coordinates) indicating location, position, acceleration, rotational speed, and/or orientation of the device. The example device 900 can also include one or more power sources 928, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 900 can also include an audio and/or video processing system 930 that generates audio data for an audio system 932 and/or generates display data for a display system 934. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 900. Alternatively, the audio system and/or the display system are external, peripheral components to the example device.

Although implementations for a UWB automation controller and environment dead zone determinations have been described in language specific to features and/or methods, the appended claims are not necessarily limited to the specific features or methods described. Rather, the specific features and methods are disclosed as example implementations for a UWB automation controller and environment dead zone determinations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A system, comprising: ultra-wideband (UWB) radios associated with respective devices in an environment; an automation controller implemented at least partially in hardware and configured to: receive UWB ranging data from the UWB radios; monitor locations of the respective devices in the environment; detect a loss of coverage by a device connected in the environment; and determine a coverage dead zone within the environment at the location of the loss of coverage by the device based on the UWB ranging data.

Alternatively or in addition to the above described system, any one or combination of: one or more of the UWB radios are UWB tags located for association with the respective devices. The automation controller is configured to determine the coverage dead zone based on a time-difference-of-arrival (TDoA) between the device and an access point, and the angle-of-arrival (AoA) to the access point. The automation controller is configured to map the coverage dead zone based on received signal strength indicator (RSSI) measurements and quality of service (QOS) metrics from the location of the loss of coverage by the device. The device that loses coverage is a mobile wireless device, and the automation controller is further configured to determine the coverage dead zone based on an orientation of the mobile wireless device at the location of the loss of coverage. The automation controller is configured to: detect a mobile wireless device wirelessly connected for communication in the environment and moving in a direction toward the coverage dead zone; and initiate the mobile wireless device switching to cellular to maintain the communication in the coverage dead zone. The loss of coverage is a voice-over-IP (VOIP) call dropped by the device. The loss of coverage is a cellular call dropped by the device. The loss of coverage includes an interruption of streaming digital media to a media device. The loss of coverage includes non-detectable motions in the environment due to a lack of camera coverage.

A computing device, comprising: an ultra-wideband (UWB) radio to communicate with environment UWB radios associated with respective devices in an environment, the UWB radio configured to receive UWB ranging data from the environment UWB radios; an automation controller implemented at least partially in hardware to: receive UWB ranging data from the UWB radios; monitor locations of the respective devices in the environment; detect a loss of coverage by a device connected in the environment; and determine a coverage dead zone within the environment at the location of the loss of coverage by the device based on the UWB ranging data.

Alternatively or in addition to the above described computing device, any one or combination of: the automation controller is configured to determine the coverage dead zone based on a time-difference-of-arrival (TDoA) between the device and an access point, and the angle-of-arrival (AoA) to the access point. The automation controller is configured to map the coverage dead zone based on received signal strength indicator (RSSI) measurements and quality of service (QOS) metrics from the location of the loss of coverage by the device. The computing device is a mobile wireless device that loses coverage, and the automation controller is further configured to determine the coverage dead zone based on an orientation of the mobile wireless device at the location of the loss of coverage. The computing device is a mobile wireless device wirelessly connected for communication in the environment and moving in a direction toward the coverage dead zone; and the automation controller is configured to initiate the mobile wireless device switching to cellular to maintain the communication in the coverage dead zone.

A method, comprising: receiving ultra-wideband (UWB) ranging data from UWB radios associated with respective devices in an environment; monitoring locations of the respective devices in the environment; detecting a loss of coverage by a device connected in the environment; and determining a coverage dead zone within the environment at the location of the loss of coverage by the device based on the UWB ranging data.

Alternatively or in addition to the above described method, any one or combination of: the determining the coverage dead zone is based on a time-difference-of-arrival (TDoA) between the device and an access point, and the angle-of-arrival (AoA) to the access point. The determining the coverage dead zone is based on received signal strength indicator (RSSI) measurements and quality of service (QOS) metrics from the location of the loss of coverage by the device. The method further comprising: detecting a mobile wireless device wirelessly connected for communication in the environment and moving in a direction toward the coverage dead zone; and initiating the mobile wireless device switching to cellular to maintain the communication in the coverage dead zone. The detecting the loss of coverage as one of a voice-over-IP (VOIP) call dropped by the device, a cellular call dropped by the device, or an interruption of streaming digital media to a media device.

The invention claimed is:

1. A system, comprising:
   ultra-wideband (UWB) radios associated with respective devices in an environment; and
   an automation controller implemented at least partially in hardware and configured to:
   receive UWB ranging data from the UWB radios;
   monitor locations and orientations of the respective devices in the environment;
   detect coverage of a device at a first location in the environment;
   detect movement of the device to a second location in the environment based on the UWB ranging data;
   detect a loss of the coverage by the device at the second location by comparing signal strength indicator (RSSI) measurements at the first location and the second location; and
   generate an indication of a coverage dead zone within the environment at a location of the loss of the coverage corresponding to the second location by the device based on the UWB ranging data, an orientation of the device at the location of the loss of the coverage, and the movement of the device.

2. The system of claim 1, wherein one or more of the UWB radios are UWB tags located for association with the respective devices.

3. The system of claim 1, wherein the automation controller is configured to determine the coverage dead zone based on a time-difference-of-arrival (TDoA) between the device and an access point, and an angle-of-arrival (AoA) to the access point.

4. The system of claim 1, wherein the automation controller is configured to map the coverage dead zone based on received and quality of service (QOS) metrics from the location of the loss of the coverage by the device.

5. The system of claim 1, wherein the automation controller is configured to:
   detect a mobile wireless device wirelessly connected for communication in the environment and moving in a direction toward the coverage dead zone; and
   initiate the mobile wireless device switching to cellular to maintain the communication in the coverage dead zone.

6. The system of claim 1, wherein the loss of the coverage is a voice-over-IP (VOIP) call dropped by the device.

7. The system of claim 1, wherein the loss of the coverage is a cellular call dropped by the device.

8. The system of claim 1, wherein the loss of the coverage includes an interruption of streaming digital media to a media device.

9. The system of claim 1, wherein the loss of the coverage includes non-detectable motions in the environment due to a lack of camera coverage.

10. The system of claim 1, wherein the automation controller is further configured to determine the coverage dead zone by identifying an additional device that is proximate to the device, and the additional device is located in the coverage dead zone.

11. A computing device, comprising:
    an ultra-wideband (UWB) radio to communicate with environment UWB radios associated with respective devices in an environment, the UWB radio configured to receive UWB ranging data from the environment UWB radios; and
    an automation controller implemented at least partially in hardware to:
    receive the UWB ranging data from the UWB radio and the environment UWB radios;
    monitor locations and orientations of the respective devices in the environment;
    detect coverage of a device at a first location in the environment;
    detect movement of the device to a second location in the environment based on the UWB ranging data;
    detect a loss of the coverage by the device at the second location by comparing signal strength indicator (RSSI) measurements at the first location and the second location; and
    generate an indication of a coverage dead zone within the environment at a location of the loss of the coverage corresponding to the second location by the device based on the UWB ranging data, an orientation of the device at the location of the loss of the coverage, and the movement of the device.

12. The computing device of claim 11, wherein the automation controller is configured to determine the coverage dead zone based on a time-difference-of-arrival (TDoA) between the device and an access point, and an angle-of-arrival (AoA) to the access point.

13. The computing device of claim 11, wherein the automation controller is configured to map the coverage dead zone based on received quality of service (QOS) metrics from the location of the loss of the coverage by the device.

14. The computing device of claim 11, wherein the computing device is a mobile wireless device that loses the coverage, and the automation controller is further configured to determine the coverage dead zone based on the orientation of the mobile wireless device at the location of the loss of the coverage.

15. The computing device of claim 11, wherein:
the computing device is a mobile wireless device wirelessly connected for communication in the environment and moving in a direction toward the coverage dead zone; and
the automation controller is configured to initiate the mobile wireless device switching to cellular to maintain the communication in the coverage dead zone.

16. A method, comprising:
receiving ultra-wideband (UWB) ranging data from UWB radios associated with respective devices in an environment;
monitoring locations and orientations of the respective devices in the environment;
detecting coverage of a device at a first location in the environment;
detecting movement of the device to a second location in the environment based on the UWB ranging data;
detecting a loss of the coverage by the device at the second location by comparing signal strength indicator (RSSI) measurements at the first location and the second location; and
generating an indication of a coverage dead zone within the environment at a location of the loss of the coverage corresponding to the second location by the device based on the UWB ranging data, an orientation of the device at the location of the loss of the coverage, and the movement of the device.

17. The method of claim 16, wherein the generating the indication of the coverage dead zone is based on a time-difference-of-arrival (TDoA) between the device and an access point, and an angle-of-arrival (AoA) to the access point.

18. The method of claim 16, wherein the generating the indication of the coverage dead zone is based on received service (QOS) metrics from the location of the loss of the coverage by the device.

19. The method of claim 16, further comprising:
detecting a mobile wireless device wirelessly connected for communication in the environment and moving in a direction toward the coverage dead zone; and
initiating the mobile wireless device switching to cellular to maintain the communication in the coverage dead zone.

20. The method of claim 16, wherein the detecting the loss of the coverage as one of a voice-over-IP (VOIP) call dropped by the device, a cellular call dropped by the device, or an interruption of streaming digital media to a media device.

* * * * *